United States Patent
Lee et al.

(10) Patent No.: US 11,683,785 B2
(45) Date of Patent: Jun. 20, 2023

(54) METHOD FOR TRANSMITTING AND RECEIVING PAGING MESSAGE IN WIRELESS COMMUNICATION SYSTEM BY USING UNLICENSED BAND, AND DEVICE THEREFOR

(71) Applicant: LG ELECTRONICS INC., Seoul (KR)

(72) Inventors: Jeongsu Lee, Seoul (KR); Seonwook Kim, Seoul (KR); Hyunsoo Ko, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 130 days.

(21) Appl. No.: 17/274,250

(22) PCT Filed: Sep. 26, 2019

(86) PCT No.: PCT/KR2019/012496
§ 371 (c)(1),
(2) Date: Mar. 8, 2021

(87) PCT Pub. No.: WO2020/067729
PCT Pub. Date: Apr. 2, 2020

(65) Prior Publication Data
US 2021/0352616 A1 Nov. 11, 2021

(30) Foreign Application Priority Data
Sep. 28, 2018 (KR) .................. 10-2018-0116576

(51) Int. Cl.
*H04W 68/00* (2009.01)
*H04W 76/28* (2018.01)
*H04W 74/08* (2009.01)
(52) U.S. Cl.
CPC ..... *H04W 68/005* (2013.01); *H04W 74/0816* (2013.01); *H04W 76/28* (2018.02)

(58) Field of Classification Search
CPC .......... H04W 68/005; H04W 74/0816; H04W 76/28; H04W 68/02; Y02D 30/70
See application file for complete search history.

(56) References Cited

U.S. PATENT DOCUMENTS

2021/0314910 A1* 10/2021 Rune .................... H04L 27/2607
2022/0039061 A1*  2/2022 Murray ................. H04W 68/02
(Continued)

FOREIGN PATENT DOCUMENTS

| KR | 10-2016-0039639 | 4/2016 |
|----|-----------------|--------|
| KR | 10-2017-0115502 | 10/2017 |
| WO | 2017-145120 | 8/2017 |

OTHER PUBLICATIONS

ZTE, "Discussion on paging operation in NR-U," R2-1809839, 3GPP TSG-RAN WG2 NR AH1807 Meeting, Montreal, Canada, Jun. 22, 2018, see section 2.
(Continued)

*Primary Examiner* — Walli Z Butt
(74) *Attorney, Agent, or Firm* — Dentons US LLP

(57) ABSTRACT

The present disclosure proposes a method for transmitting and receiving paging message in a wireless communication system by using unlicensed band, and a device therefore. Specifically, the method performed by a user equipment (UE) may include: receiving, from a base station, paging occasion (PO) configuration information including paging frame (PF) set information; receiving, from the base station, control information related to paging based on the PO configuration information; and receiving, from the base station, a paging message based on the control information, in which the PF set information may be information for bundling of PFs, and POs related to the PFs may be consecutively configured in a time domain.

15 Claims, 20 Drawing Sheets

(56) References Cited

U.S. PATENT DOCUMENTS

2022/0046540 A1\* 2/2022 Kwon .................. H04W 68/005
2022/0116911 A1\* 4/2022 Lee ....................... H04W 68/00

OTHER PUBLICATIONS

Ericsson, "Bundling paging messages, CE capability and UE behavior," R2-154789, 3GPP TSG-RAN WG2 #91 bis, Malmo, Sweden, Sep. 25, 2015, see section 2.1.

\* cited by examiner

[FIG. 1]
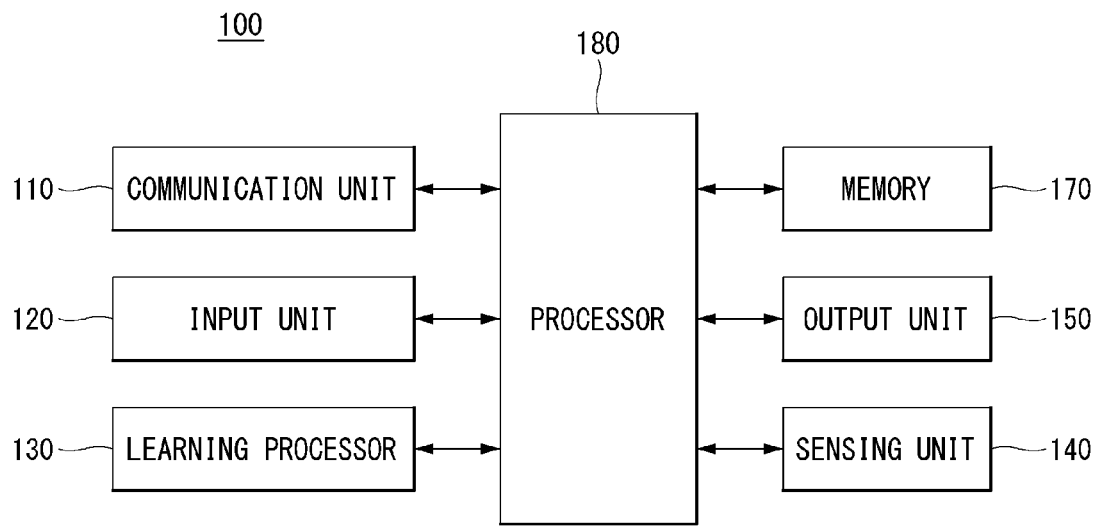
[FIG. 2]
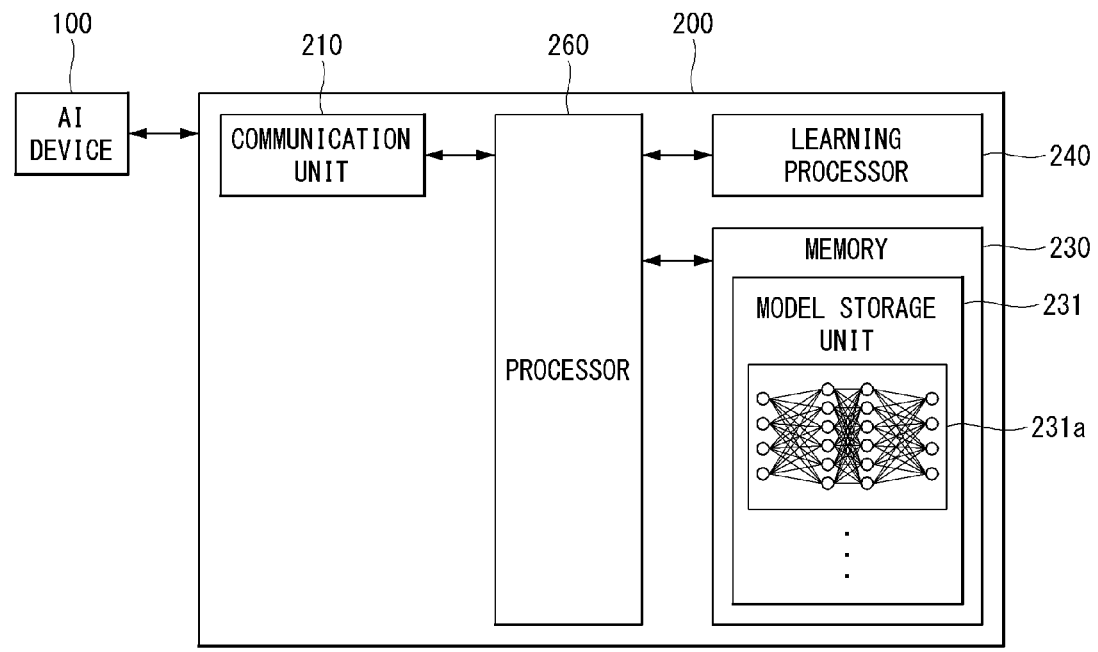

[FIG. 3]
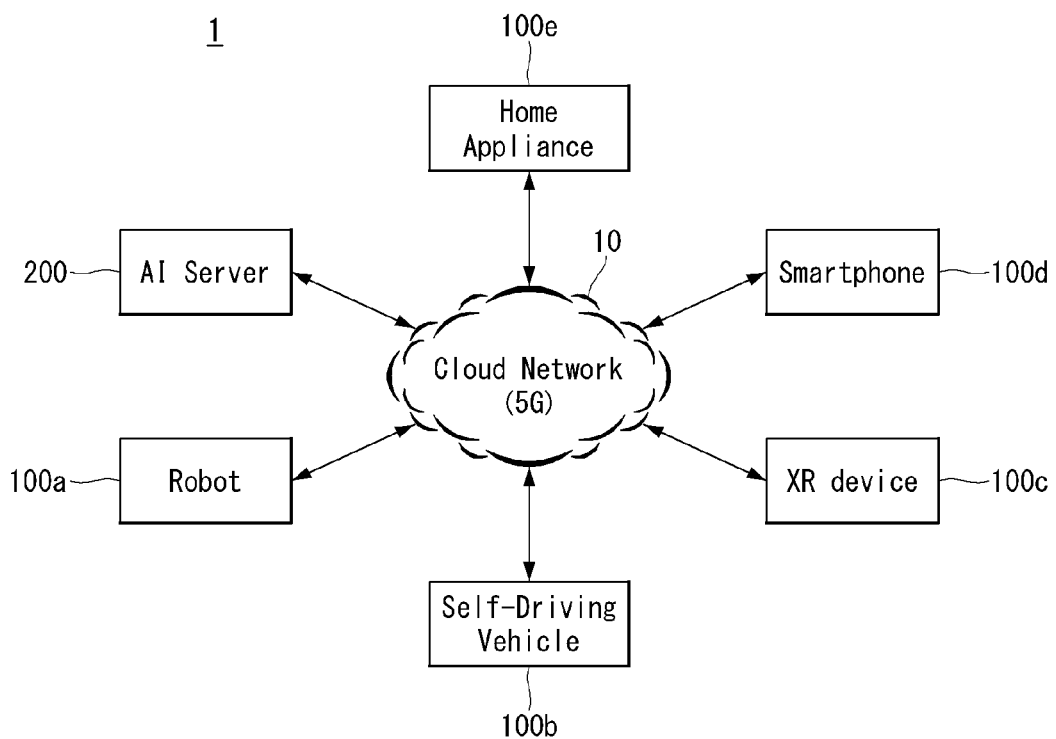

[FIG. 4]
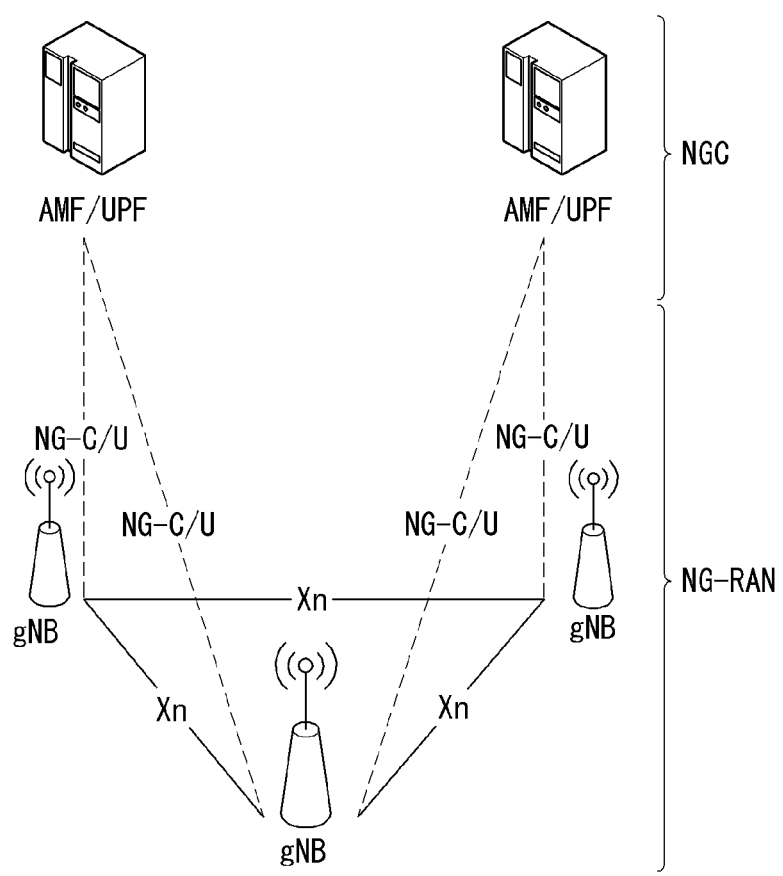

[FIG. 5]
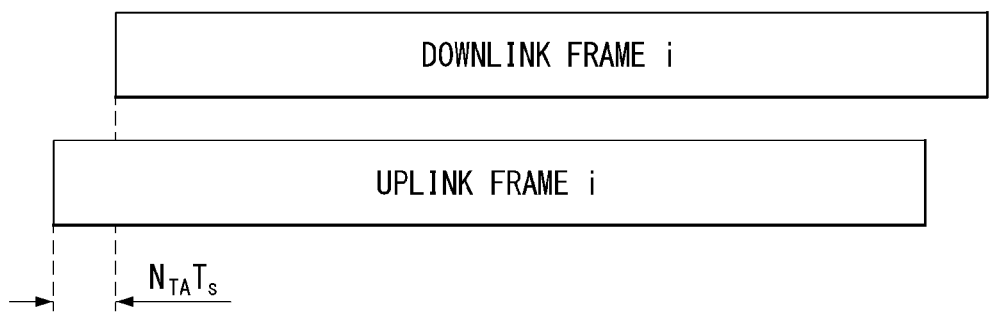

[FIG. 6]
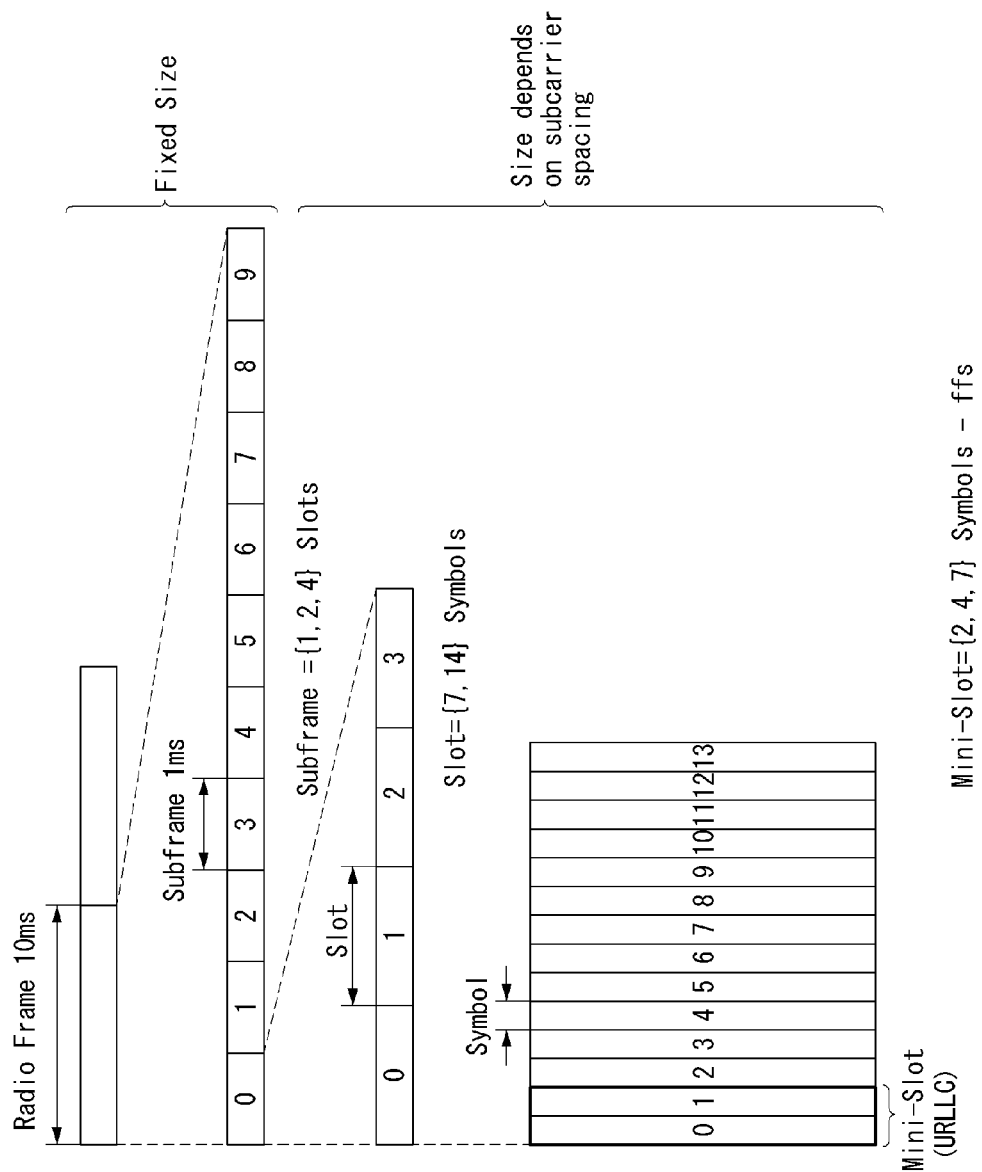

[FIG. 7]
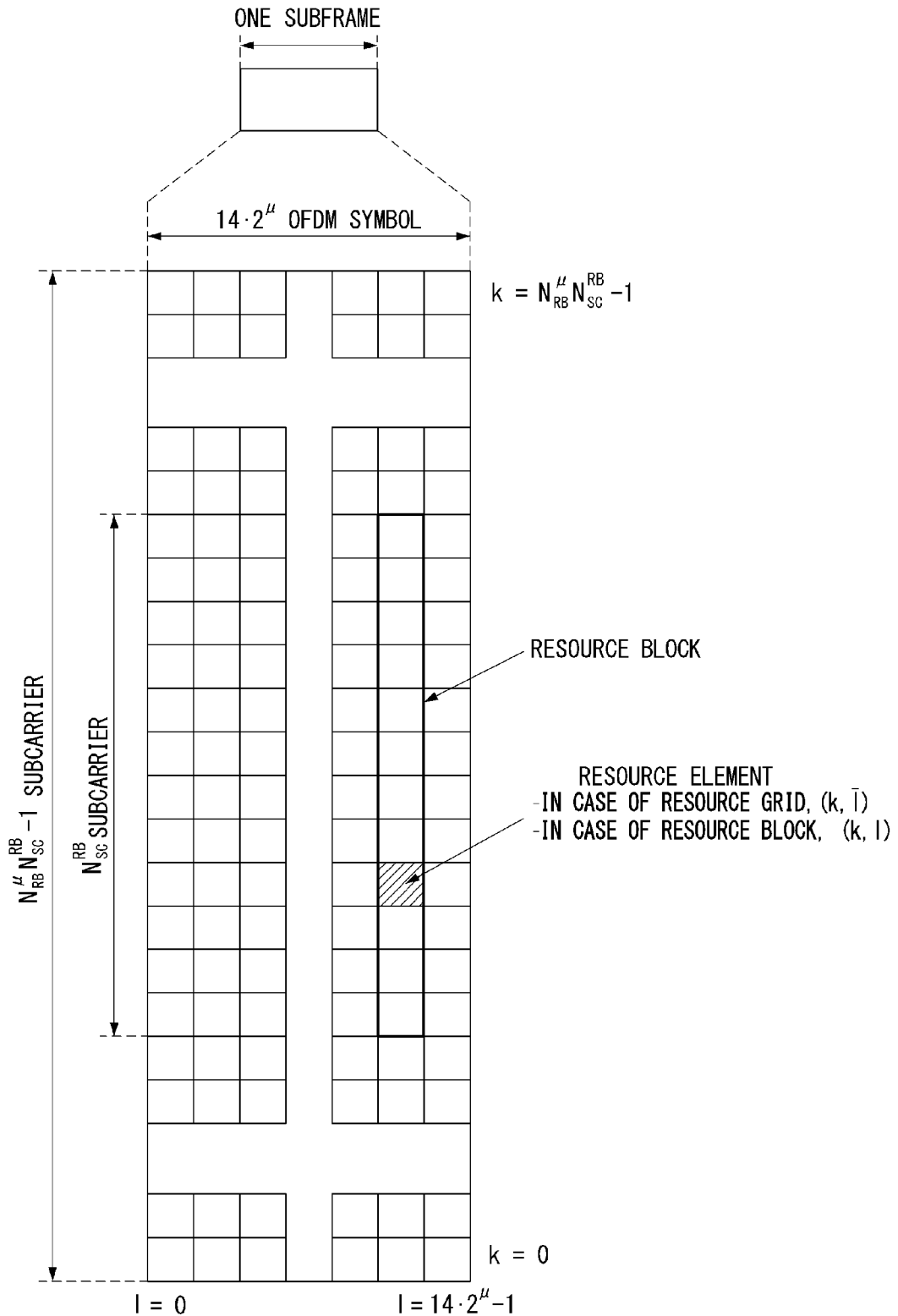

[FIG. 8]
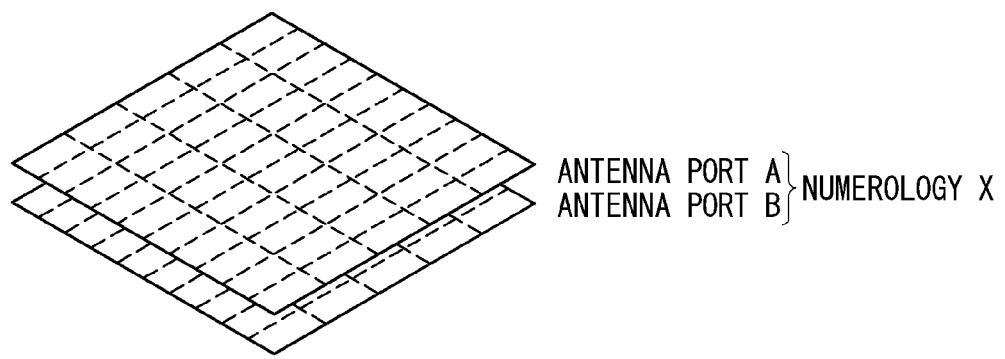
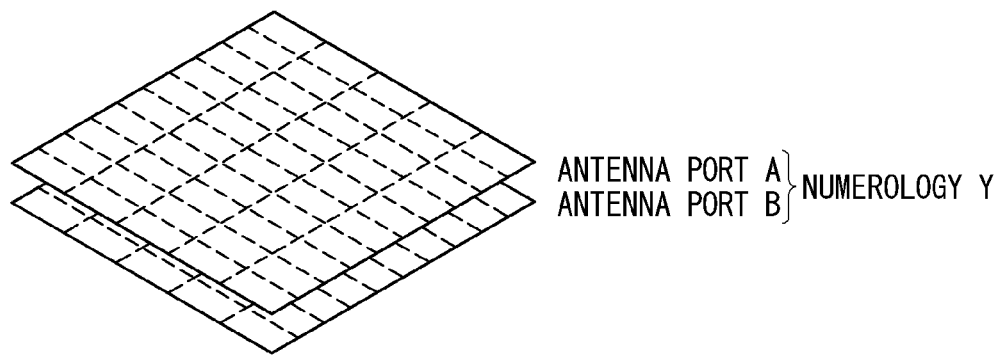

[FIG. 9]
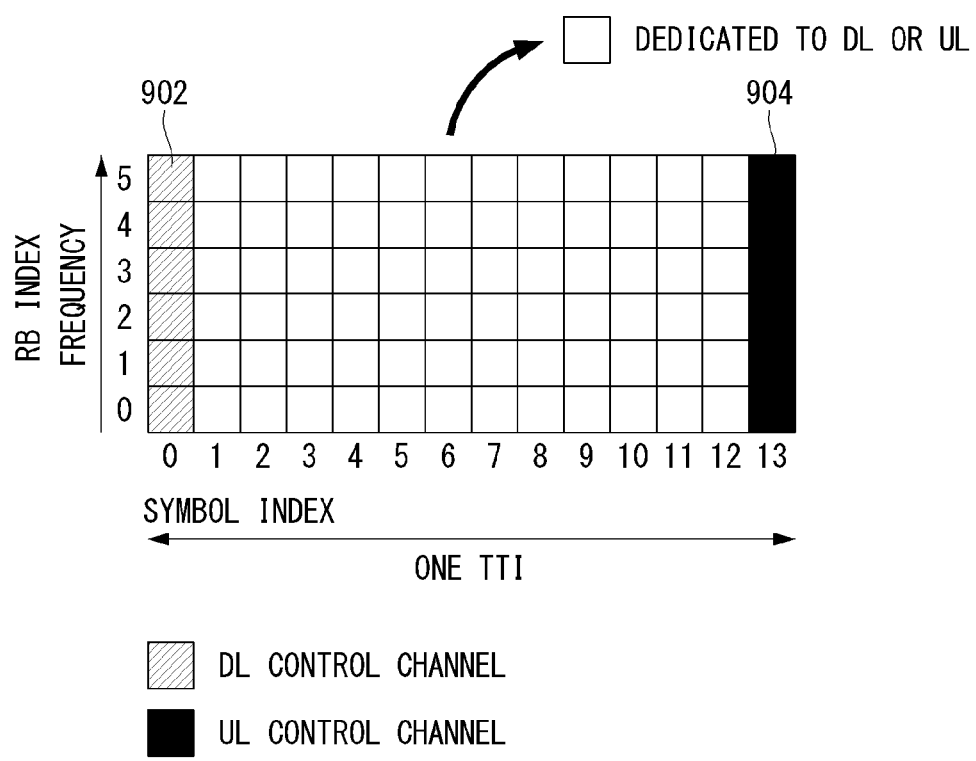

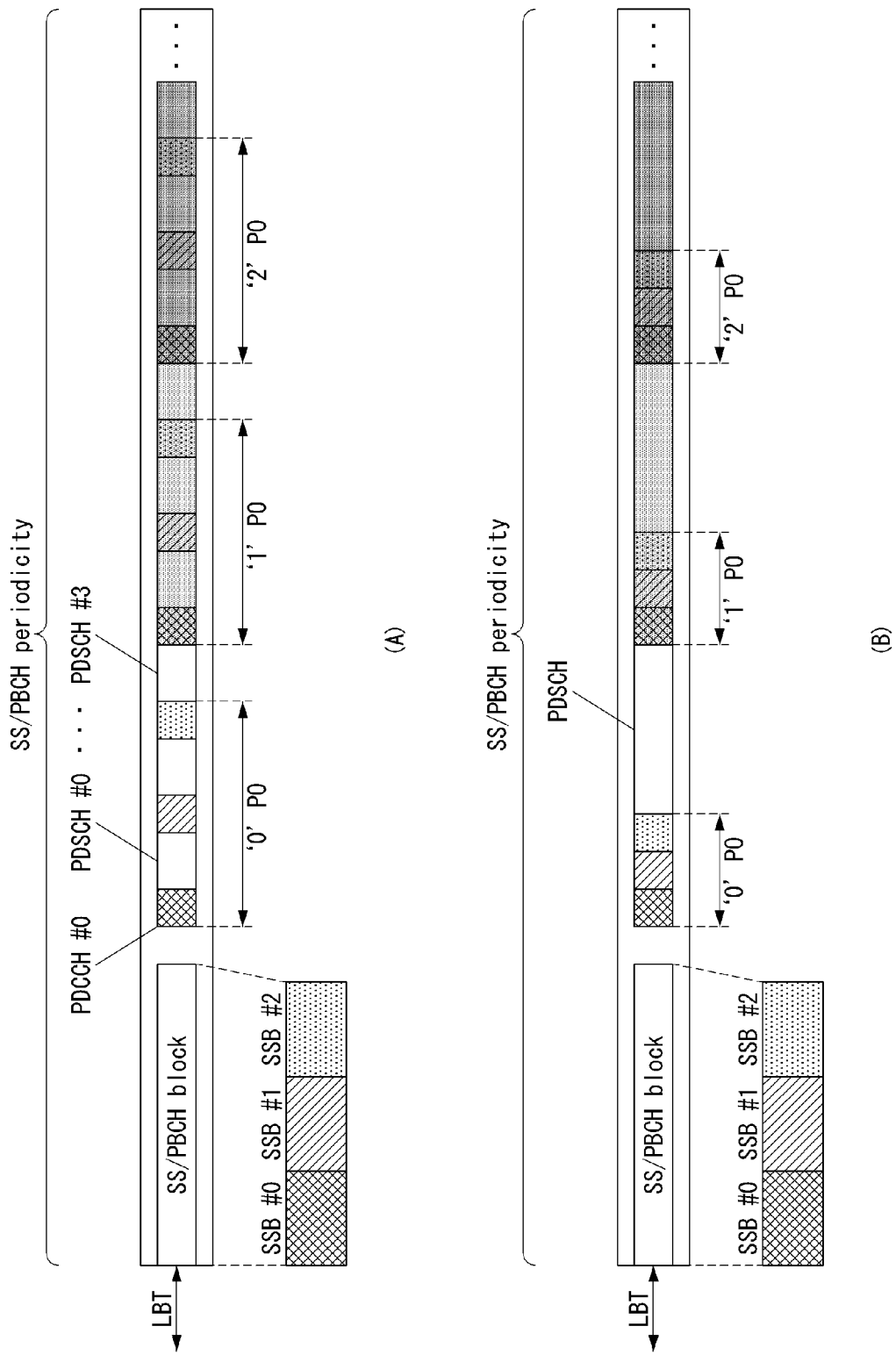
[FIG. 10]

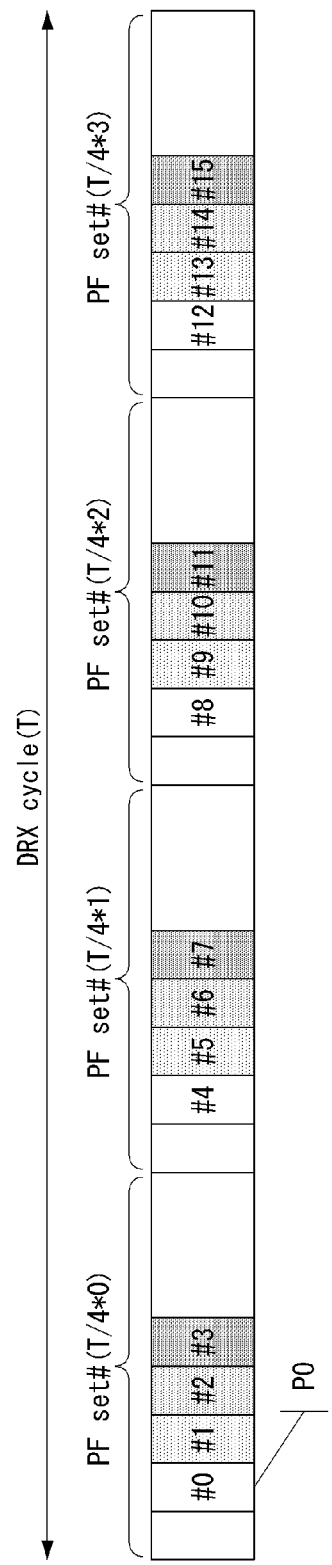
[FIG. 12]

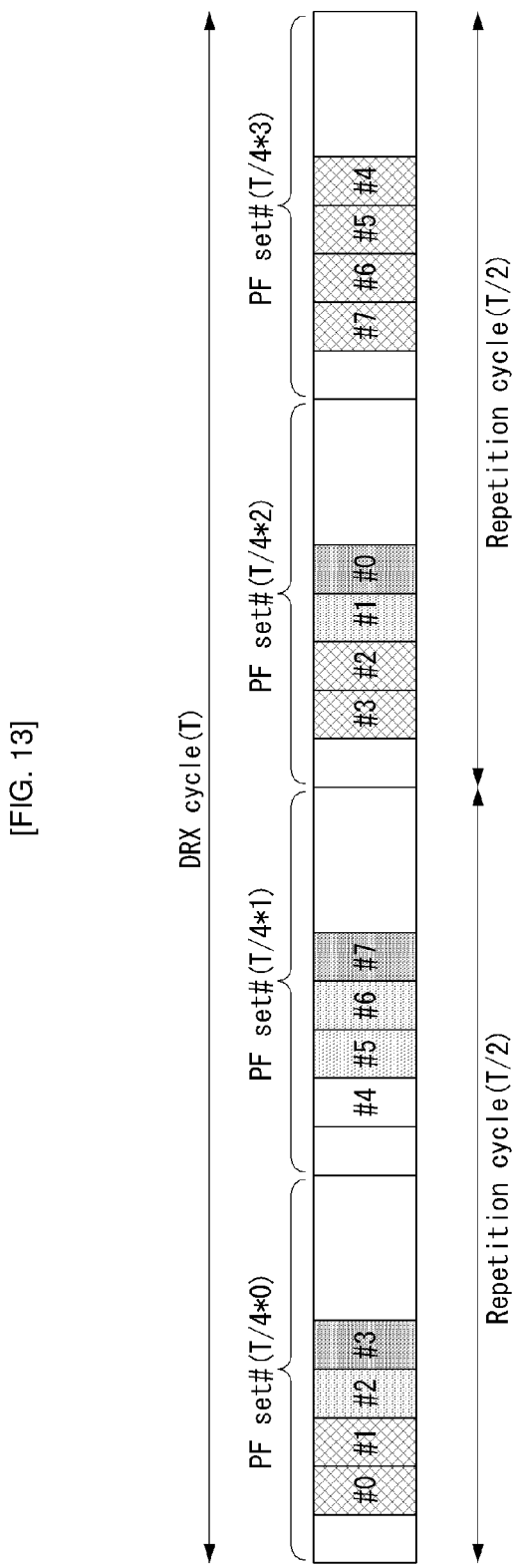
[FIG. 13]

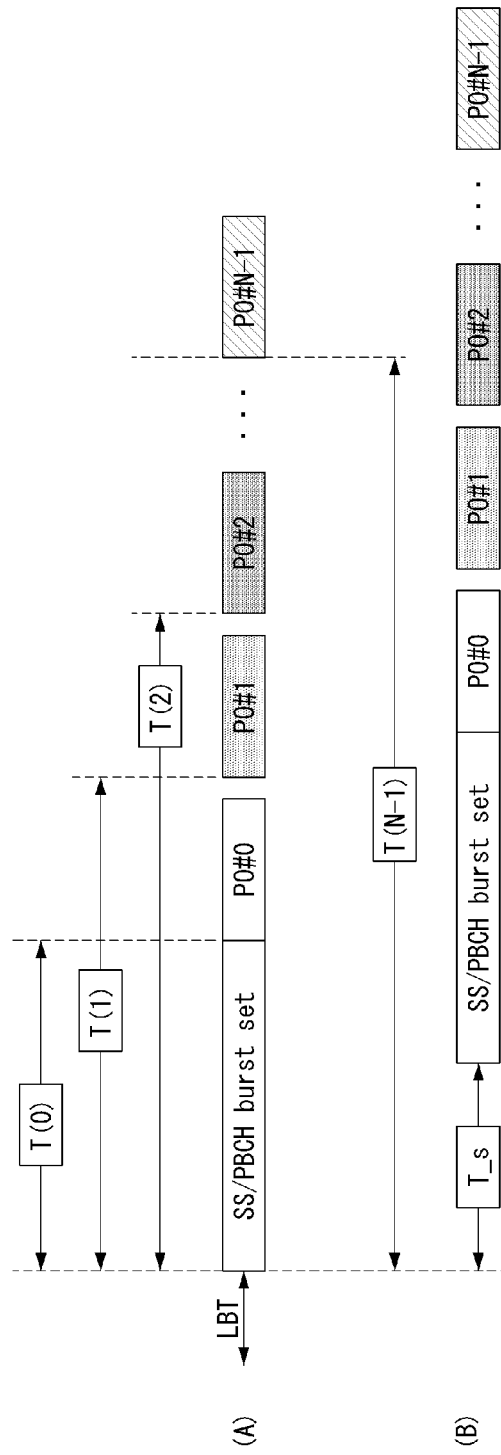
[FIG. 14]

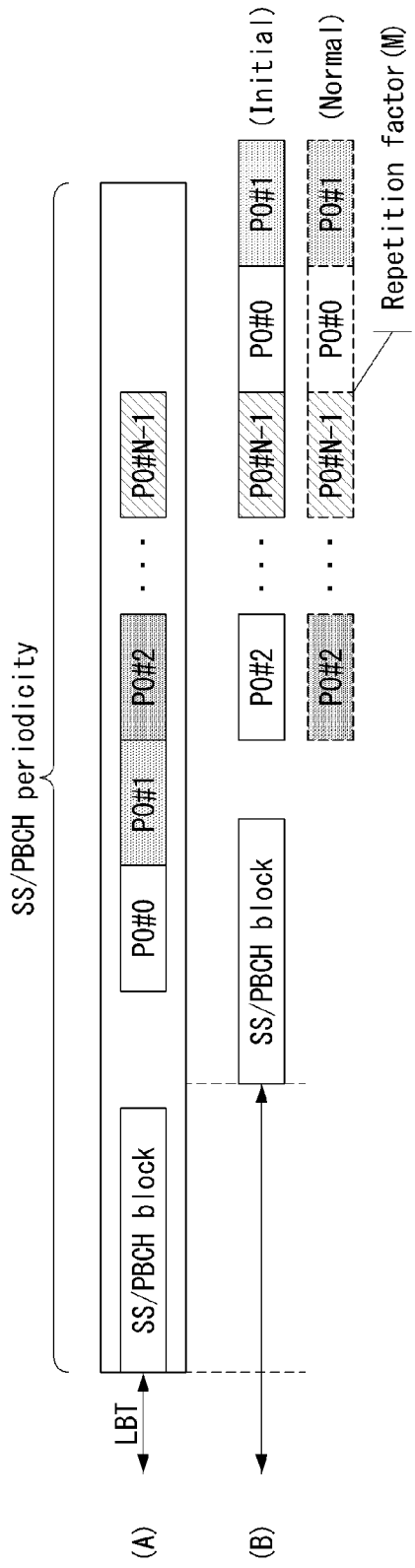
[FIG. 15]

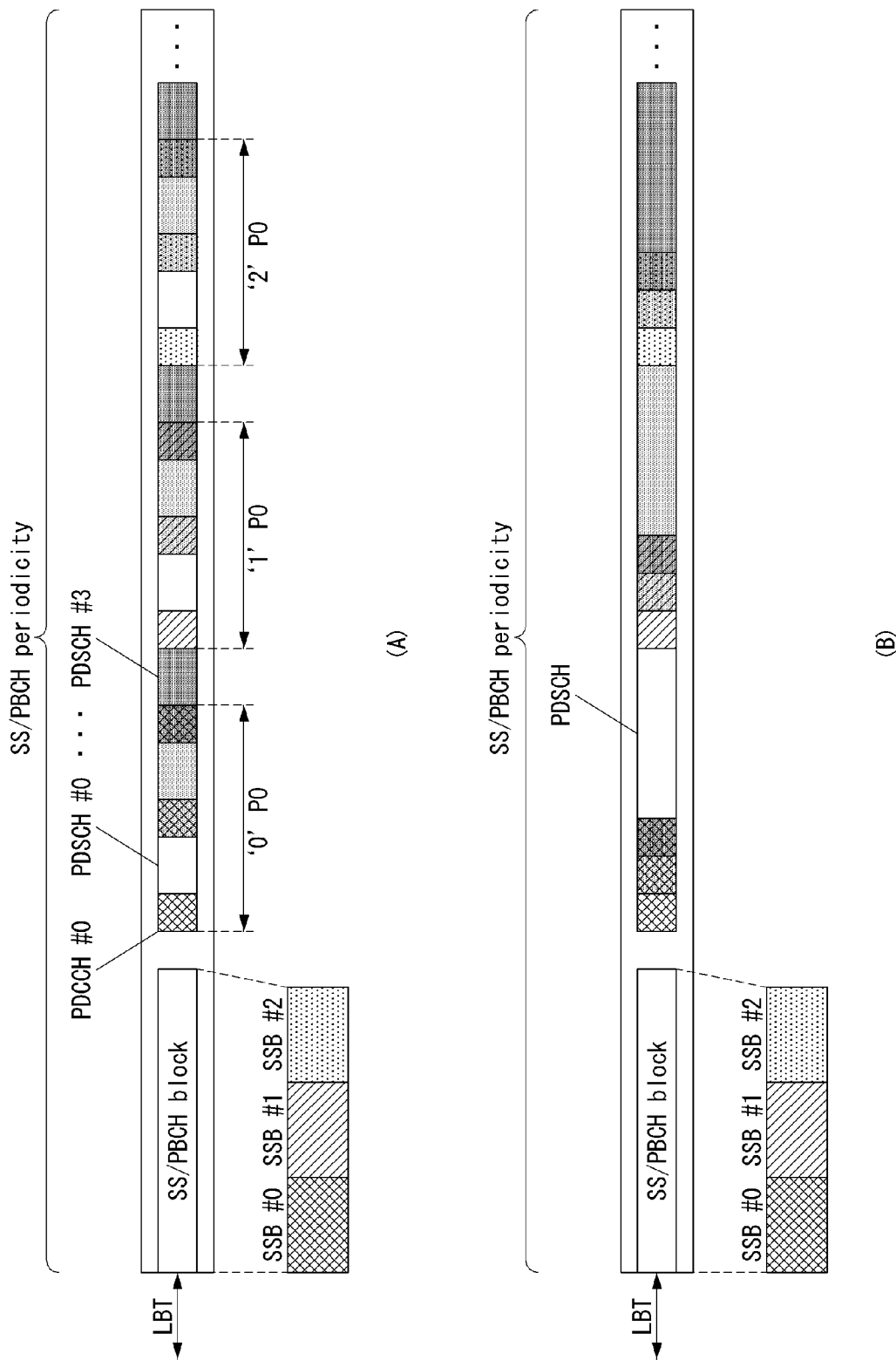
[FIG. 16]

[FIG. 17]
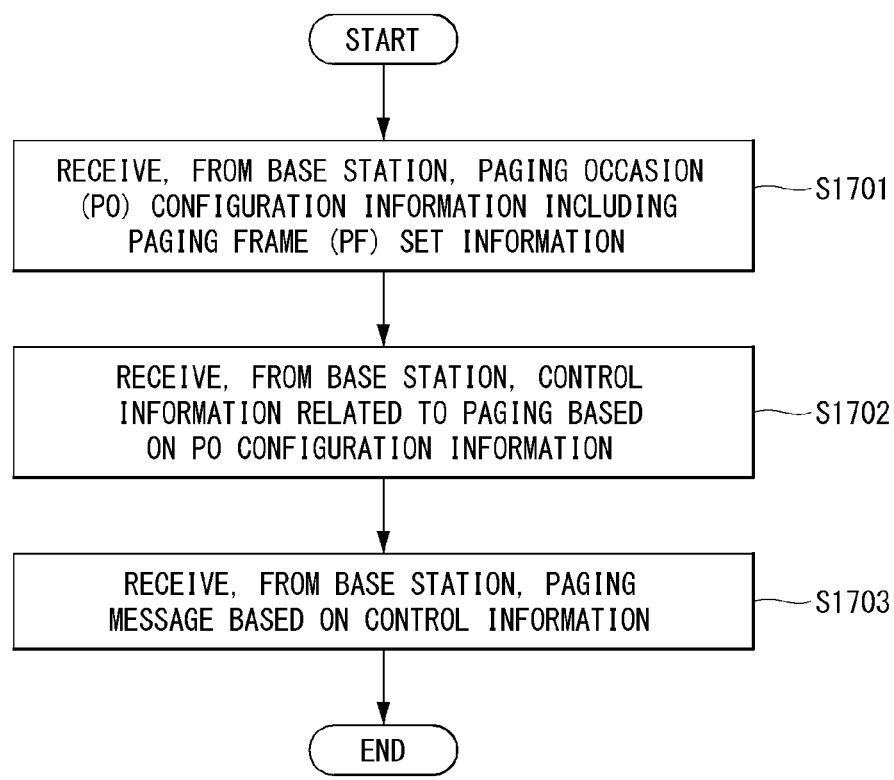

[FIG. 18]
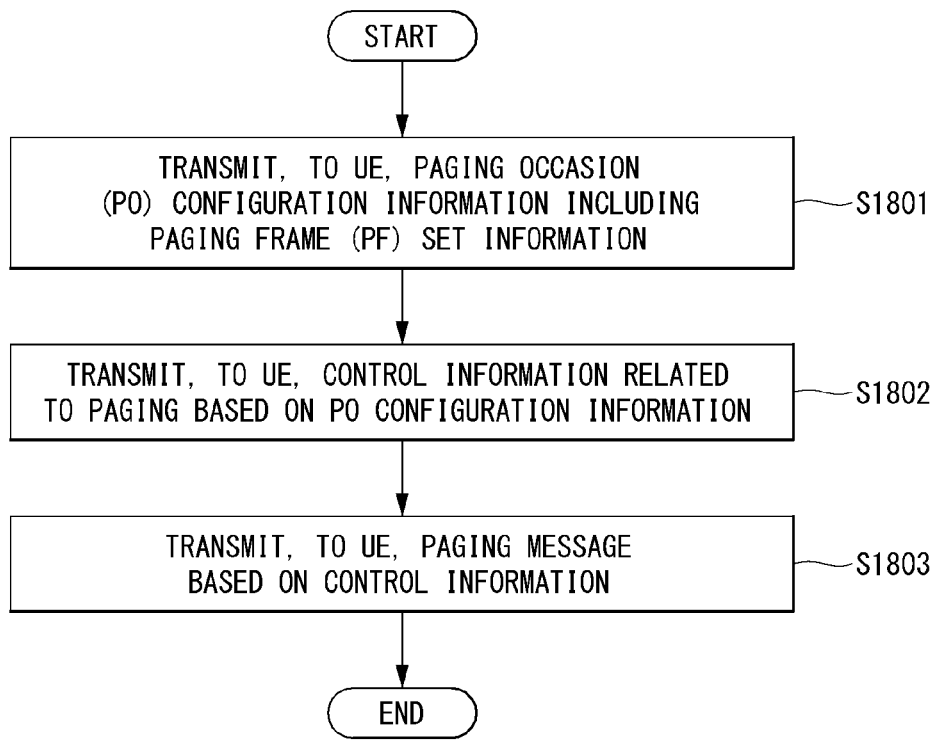

[FIG. 19]
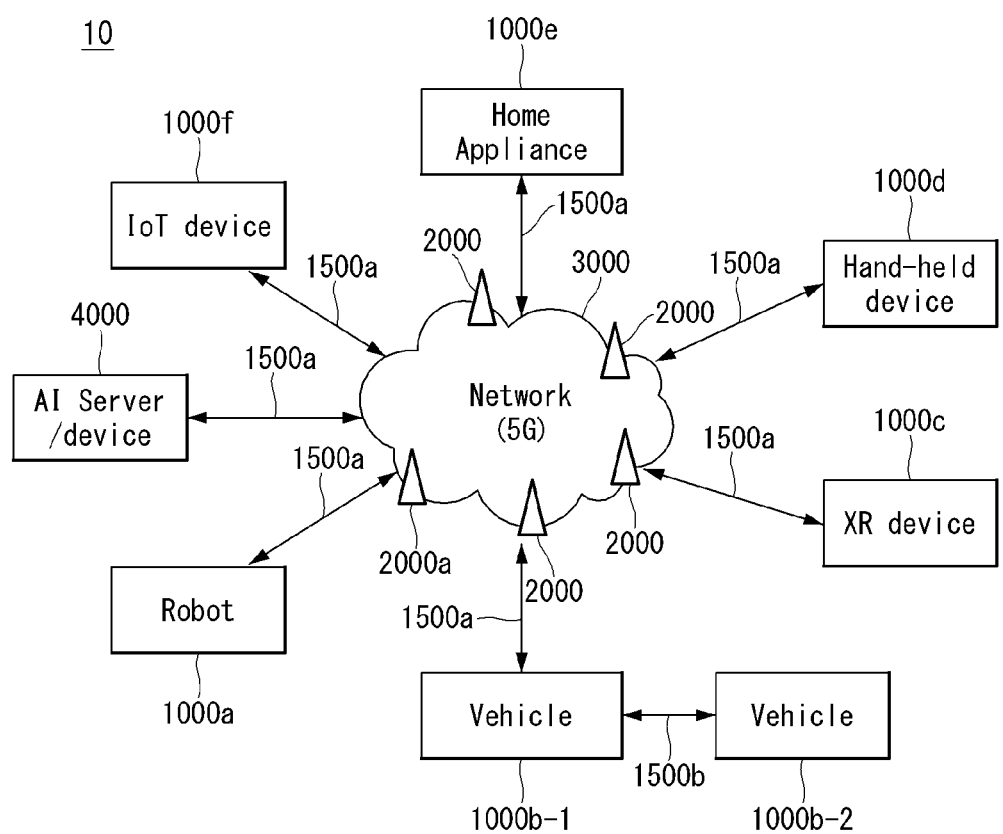

[FIG. 20]
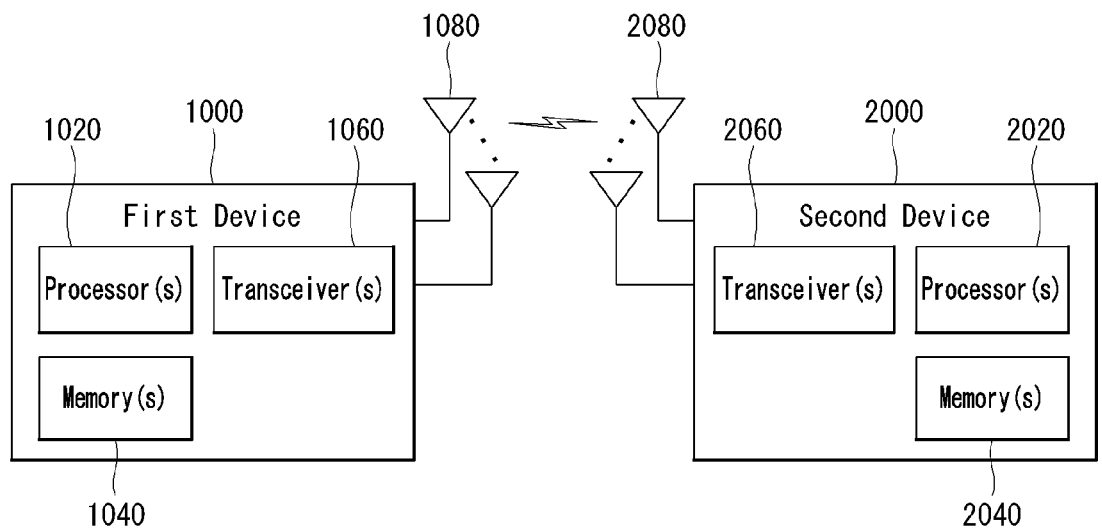
[FIG. 21]
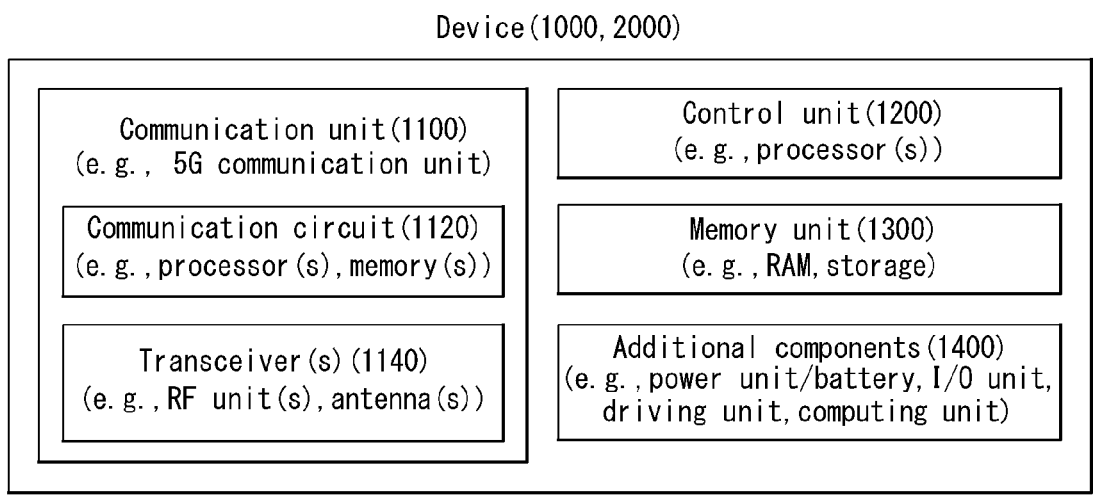

[FIG. 22]
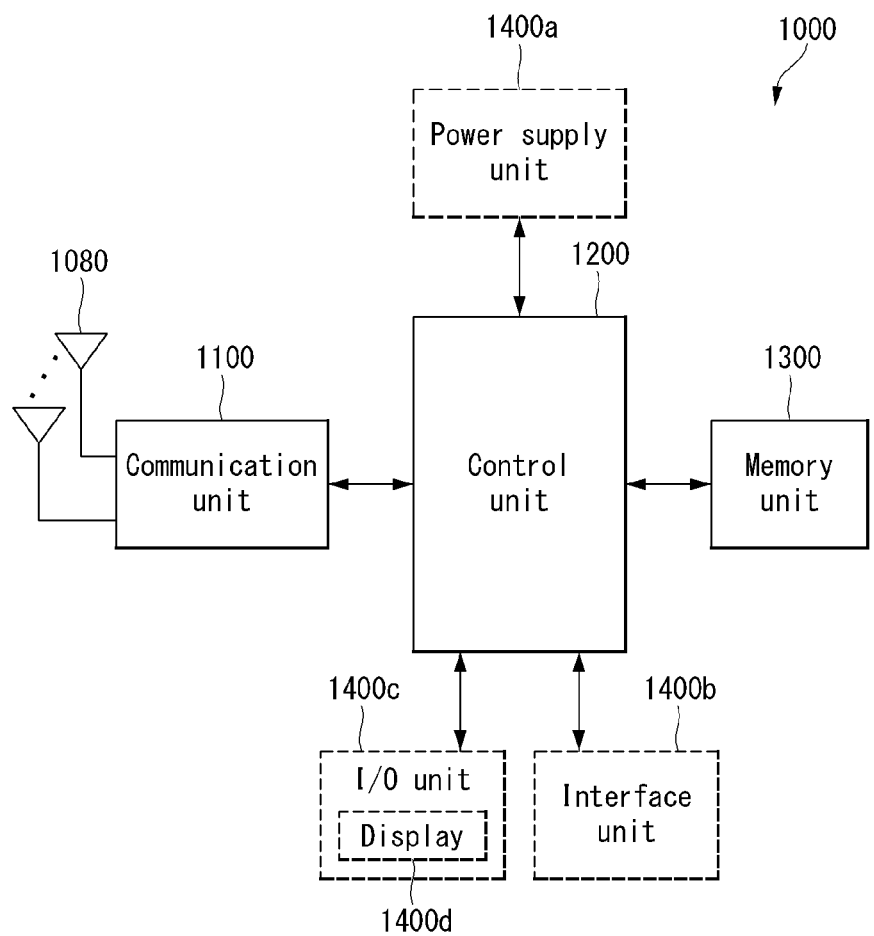

METHOD FOR TRANSMITTING AND RECEIVING PAGING MESSAGE IN WIRELESS COMMUNICATION SYSTEM BY USING UNLICENSED BAND, AND DEVICE THEREFOR

TECHNICAL FIELD

The present disclosure relates to a wireless communication system, and particularly, to a method of transmitting and receiving a paging message and a device for supporting the same.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

DISCLOSURE

Technical Problem

The present disclosure proposes a method of consecutively transmitting and receiving paging occasions (POs) in an unlicensed band and a device therefor.

Furthermore, the present disclosure proposes a method of repeatedly transmitting and receiving the POs and a device therefor.

The technical objects of the present disclosure are not limited to the aforementioned technical objects, and other technical objects, which are not mentioned above, will be apparently appreciated by a person having ordinary skill in the art from the following description.

Technical Solution

The present disclosure proposes a method of receiving a paging message in a wireless communication system using an unlicensed band. The method performed by a user equipment (UE) may include: receiving, from a base station, paging occasion (PO) configuration information including paging frame (PF) set information; receiving, from the base station, control information related to paging based on the PO configuration information; and receiving, from the base station, a paging message based on the control information, in which the PF set information may be information for bundling of PFs, and POs related to the PFs may be consecutively configured in a time domain.

Furthermore, in the method of the present disclosure, a Listen Before Talk (LBT) operation for the POs may be performed before a first PO among the POs.

Furthermore, in the method of the present disclosure, the POs may be consecutively configured in a first PF among the PFs.

Furthermore, in the method of the present disclosure, the PF set information may be defined as a factor of a Discontinuous Reception (DRX) cycle.

Furthermore, in the method of the present disclosure, the PO configuration information may further include information for a repetition cycle, and the POs may be configured repeatedly at the repetition cycle within the DRX cycle.

Furthermore, in the method of the present disclosure, the repeated POs may be shuffled and configured.

Furthermore, in the present disclosure, a user equipment (UE) receiving a paging message in a wireless communication system using an unlicensed band may include: a Radio Frequency (RF) unit transmitting/receiving a radio signal; and a processor functionally connected to the RF unit, in which the processor may be configured to: receive, from a base station, paging occasion (PO) configuration information including paging frame (PF) set information, receive, from the base station, control information related to paging based on the PO configuration information, and receive, from the base station, a paging message based on the control information, the PF set information may be information for bundling of PFs, and POs related to the PFs may be consecutively configured in a time domain.

Furthermore, in the UE of the present disclosure, a Listen Before Talk (LBT) operation for the POs may be performed before a first PO among the POs.

Furthermore, in the UE of the present disclosure, the POs may be consecutively configured in a first PF among the PFs.

Furthermore, in the UE of the present disclosure, the PF set information may be defined as a factor of a Discontinuous Reception (DRX) cycle.

Furthermore, in the UE of the present disclosure, the PO configuration information may further include information for a repetition cycle, and the POs may be configured repeatedly at the repetition cycle within the DRX cycle.

Furthermore, in the UE of the present disclosure, the repeated POs may be shuffled and configured.

Furthermore, in the present disclosure, a base station transmitting a paging message in a wireless communication system using an unlicensed band may include: a Radio Frequency (RF) unit transmitting/receiving a radio signal; and a processor functionally connected to the RF unit, in which the processor may be configured to: transmit, to a user equipment (UE), paging occasion (PO) configuration information including paging frame (PF) set information, transmit, to the UE, control information related to paging based on the PO configuration information, and transmit, to the UE, a paging message based on the control information, the PF set information may be information for bundling of PFs, and POs related to the PFs may be consecutively configured in a time domain.

Furthermore, in the base station of the present disclosure, a Listen Before Talk (LBT) operation for the POs may be performed before a first PO among the POs.

Furthermore, in the base station of the present disclosure, the POs may be consecutively configured in a first PF among the PFs.

Advantageous Effects

According to the present disclosure, there is an effect that resource waste by Listen (LBT) can be improved by consecutively transmitting and receiving paging occasions (POs) in an unlicensed band.

Furthermore, according to the present disclosure, there is an effect that paging message adjacent to an LBT resource can be transmitted and received with low latency even when the LBT is unsuccessful by repeatedly transmitting and receiving consecutive POs every specific cycle.

Furthermore, according to the present disclosure, there is an effect that a communication system having high reliability and low latency in the unlicensed band can be implemented.

Effects obtainable from the present disclosure are not limited by the effects mentioned above, and other effects which are not mentioned above can be clearly understood from the following description by those skilled in the art to which the present disclosure pertains.

DESCRIPTION OF DRAWINGS

The accompany drawings, which are included as part of the detailed description in order to help understanding of the present disclosure, provide embodiments of the present disclosure and describe the technical characteristics of the present disclosure along with the detailed description.

FIG. 1 illustrates an AI device to which a method proposed by the present disclosure is applicable.

FIG. 2 illustrates an AI server to which a method proposed by the present disclosure is applicable.

FIG. 3 illustrates an AI system to which a method proposed by the present disclosure is applicable.

FIG. 4 is a diagram illustrating an example of an overall system structure of NR to which a method proposed by the present disclosure is applicable.

FIG. 5 illustrates a relationship between an uplink frame and a downlink frame in a wireless communication system to which a method proposed by the present disclosure is applicable.

FIG. 6 illustrates an example of a frame structure in an NR system.

FIG. 7 illustrates an example of a resource grid supported by a wireless communication system to which a method proposed by the present disclosure is applicable.

FIG. 8 illustrates examples of a resource grid for each antenna port and numerology to which a method proposed by the present disclosure is applicable.

FIG. 9 illustrates one example of a self-contained structure to which a method proposed by the present disclosure is applicable.

FIG. 10 is a diagram illustrating a method of consecutively configuring POs transmitting an SS/PBCH block and RMSI.

FIG. 11 is a diagram for describing a method of consecutively configuring POs in multiple PFs.

FIG. 12 is a diagram for describing a method of consecutively configuring POs for each PF set within a DRX cycle.

FIG. 13 is a diagram for describing a method of configuring POs by using a repetition period.

FIG. 14 is a diagram for describing a method of configuring locations of POs based on an SS and/or PBCH block.

FIG. 15 is a diagram for describing a method of configuring a PO as an absolute location from the SS and/or PBCH block.

FIG. 16 is a diagram for describing a method of configuring POs of an identical beam as a set and consecutively configuring the POs.

FIG. 17 is a flowchart for describing an operation method of a user equipment (UE) proposed by the present disclosure.

FIG. 18 is a flowchart for describing an operation method of a base station proposed by the present disclosure.

FIG. 19 illustrates a communication system 10 applied to the present disclosure.

FIG. 20 illustrates a wireless device applicable to the present disclosure.

FIG. 21 illustrates another example of a wireless device applied to the present disclosure.

FIG. 22 illustrates a hand-held device applied to the present disclosure.

MODE FOR INVENTION

Hereafter, preferred embodiments of the present disclosure will be described in detail with reference to the accompanying drawings. A detailed description to be disclosed hereinbelow together with the accompanying drawing is to describe embodiments of the present disclosure and not to describe a unique embodiment for carrying out the present disclosure. The detailed description below includes details in order to provide a complete understanding. However, those skilled in the art know that the present disclosure can be carried out without the details.

In some cases, in order to prevent a concept of the present disclosure from being ambiguous, known structures and devices may be omitted or may be illustrated in a block diagram format based on core function of each structure and device.

In the present disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present disclosure and the use of the specific terms may be modified into other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service(GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present disclosure may be based on standard documents disclosed in at least one of IEEE 802, 3GPP, and 3GPP2 which are the wireless access systems. That is, steps or parts which are not described to definitely show the technical spirit of the present disclosure among the embodiments of the present disclosure may be based on the documents. Further, all terms disclosed in the document may be described by the standard document.

3GPP LTE/LTE-A/NR is primarily described for clear description, but technical features of the present disclosure are not limited thereto.

Hereinafter, examples of 5G use scenarios to which a method proposed in the present disclosure may be applied are described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

[70] URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 illustrates an AI device 100 to which a method proposed by the present disclosure is applicable.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 2 illustrates the AI server 200 to which a method proposed by the present disclosure is applicable.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 illustrates an AI system 1 to which a method proposed by the present disclosure is applicable.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

AI+Robot

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100*a* may perform an operation or run by controlling the driving unit based on a user's control/interaction. In this case, the robot 100*a* may obtain intention information of an interaction according to a user's behavior or voice speaking, may determine a response based on the obtained intention information, and may perform an operation.

AI+Self-Driving

An AI technology is applied to the self-driving vehicle 100*b*, and the self-driving vehicle 100*b* may be implemented as a movable type robot, a vehicle, an unmanned flight body, etc.

The self-driving vehicle 100*b* may include a self-driving control module for controlling a self-driving function. The self-driving control module may mean a software module or a chip in which a software module has been implemented using hardware. The self-driving control module may be included in the self-driving vehicle 100*b* as an element of the self-driving vehicle 100*b*, but may be configured as separate hardware outside the self-driving vehicle 100*b* and connected to the self-driving vehicle 100*b*.

The self-driving vehicle 100*b* may obtain state information of the self-driving vehicle 100*b*, may detect (recognize) a surrounding environment and object, may generate map data, may determine a moving path and running plan, or may determine an operation using sensor information obtained from various types of sensors.

In this case, in order to determine the moving path and running plan, like the robot 100*a*, the self-driving vehicle 100*b* may use sensor information obtained from at least one sensor among LIDAR, a radar and a camera.

Particularly, the self-driving vehicle 100*b* may recognize an environment or object in an area whose view is blocked or an area of a given distance or more by receiving sensor information for the environment or object from external devices, or may directly receive recognized information for the environment or object from external devices.

The self-driving vehicle 100*b* may perform the above operations using a learning model configured with at least one artificial neural network. For example, the self-driving vehicle 100*b* may recognize a surrounding environment and object using a learning model, and may determine the flow of running using recognized surrounding environment information or object information. In this case, the learning model may have been directly trained in the self-driving vehicle 100*b* or may have been trained in an external device, such as the AI server 200.

In this case, the self-driving vehicle 100*b* may directly generate results using the learning model and perform an operation, but may perform an operation by transmitting sensor information to an external device, such as the AI server 200, and receiving results generated in response thereto.

The self-driving vehicle 100*b* may determine a moving path and running plan using at least one of map data, object information detected from sensor information or object information obtained from an external device. The self-driving vehicle 100*b* may run based on the determined moving path and running plan by controlling the driving unit.

The map data may include object identification information for various objects disposed in the space (e.g., road) in which the self-driving vehicle 100*b* runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100*b* may perform an operation or may run by controlling the driving unit based on a user's control/interaction. In this case, the self-driving vehicle 100*b* may obtain intention information of an interaction according to a user' behavior or voice speaking, may determine a response based on the obtained intention information, and may perform an operation.

AI+XR

An AI technology is applied to the XR device 100*c*, and the XR device 100*c* may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100*c* may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100*c* may output an XR object, including additional information for a recognized object, by making the XR object correspond to the corresponding recognized object.

The XR device 100*c* may perform the above operations using a learning model configured with at least one artificial neural network. For example, the XR device 100*c* may recognize a real object in three-dimensional point cloud data or image data using a learning model, and may provide information corresponding to the recognized real object. In this case, the learning model may have been directly trained in the XR device 100*c* or may have been trained in an external device, such as the AI server 200.

In this case, the XR device 100*c* may directly generate results using a learning model and perform an operation, but may perform an operation by transmitting sensor information to an external device, such as the AI server 200, and receiving results generated in response thereto.

AI+Robot+Self-Driving

An AI technology and a self-driving technology are applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* to which the AI technology and the self-driving technology have been applied may mean a robot itself having a self-driving function or may mean the robot 100*a* interacting with the self-driving vehicle 100*b*.

The robot 100*a* having the self-driving function may collectively refer to devices that autonomously move along a given flow without control of a user or autonomously determine a flow and move.

The robot 100*a* and the self-driving vehicle 100*b* having the self-driving function may use a common sensing method in order to determine one or more of a moving path or a running plan. For example, the robot 100*a* and the self-driving vehicle 100*b* having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

As propagation of smartphones and Internet of things (IoT) terminals rapidly spreads, the amount of information which is transmitted and received through a communication network increases. Accordingly, the next generation wireless access technology is an environment (e.g., enhanced mobile broadband communication) that provides a faster service to more users than conventional communication systems (or conventional radio access technology) needs to be considered.

To this end, a design of a communication system that considers machine type communication (MTC) providing a service by connecting multiple devices and objects is being discussed. Further, a design of a communication system (e.g., Ultra-Reliable and Low Latency Communication (URLLC)) considering a service and/or a terminal sensitive to reliability and/or latency of communication is also being discussed.

Hereinafter, in the present disclosure, for convenience of description, the next-generation radio access technology is referred to as a new radio access technology (RAT) and the wireless communication system to which the NR is applied is referred to as an NR system.

Definition of Terms eLTE eNB: The eLTE eNB is the evolution of an eNB that supports connections to Evolved Packet Core (EPC) and Next Generation Core (NGC).

gNB: Node that supports the NR as well as connection to the NGC.

New RAN: Wireless access network that supports the NR or the E-UTRA or interacts with the NGC.

Network slice: The network slice is a network defined by an operator to provide an optimized solution for a specific market scenario that requires specific requirements with end-to-end coverage.

Network function: The network function is a logic node in a network infrastructure having a well defined external interface and a well defined functional operation.

NG-C: Control plane interface used for an NG reference point between the new RAN and the NGC.

NG-U: User plane interface used for an NG3 reference point between the new RAN and the NGC.

Non-standalone NR: Arrangement configuration in which gNB requests an LTE eNB as an anchor for control plane connection to EPC or the eLTE eNB as the anchor for the control plane connection to the NGC.

Non-standalone E-UTRA: Arrangement configuration in which the eLTE eNB requires the gNB as the anchor for the control plane connection to the NGC.

User plane gateway: Endpoint of NG-U interface.

Overview of System

FIG. 4 is a diagram illustrating an example of an overall system structure of NR to which a method proposed by the present disclosure is applicable.

Referring to FIG. 4, NG-RAN is constituted by gNBs providing a control plane (RRC) protocol end for an NG-RA user plane (new AS sublayer/PDCP/RLC/MAC/PHY) and a user equipment (UE).

The gNBs are interconnected through an Xn interface.

The gNB is also connected to NGC through an NG interface.

More specifically, the gNB is connected to an Access and Mobility Management Function (AMF) through an N2 interface and a User Plane Function (UPF) through an N3 interface.

New Rat (NR) Numerology and Frame Structure

The NR system may support multiple numerologies. Here, the numerology may be defined by a subcarrier spacing and cyclic prefix (CP) overhead. In this case, multiple subcarrier spacings may be derived by scaling a basic subcarrier spacing with an integer N (or μ). Further, even if it is assumed that a very low subcarrier spacing is not used at a very high carrier frequency, the used numerology may be selected independently of a frequency band.

In addition, in the NR system, various frame structures depending on multiple numerologies may be supported.

Hereinafter, Orthogonal Frequency Division Multiplexing (OFDM) numerology and the frame structure which may be considered in the NR system will be described.

Multiple OFDM numerologies supported in the NR system may be defined as shown in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In relation to the frame structure in the NR system, sizes of various fields in the time domain are expressed as a multiple of a time unit of $T_s=1/(\Delta f_{max} \cdot N_f)$. Here, $\Delta f_{max}=480 \cdot 10^3$ and $N_f=409$. Downlink and uplink transmission is constituted by a radio frame having an interval of $T_f=(\Delta f_{max} N_f/100) \cdot T_s=10$ ms. Here, the radio frame is constituted by 10 subframes each having an interval of $T_{sf}=(\Delta f_{max} N_f/1000) \cdot T_s=1$ ms. In this case, there may be one set of frames for uplink and one set of frames for downlink.

FIG. 5 illustrates a relationship between an uplink frame and a downlink frame in a wireless communication system to which a method proposed by the present disclosure is applicable.

As illustrated in FIG. 5, transmission of uplink frame number i from the user equipment (UE) should be started earlier than the start of the corresponding downlink frame in the corresponding UE by $T_{TA}=N_{TA}T_s$.

For numerology μ, slots are numbered in an increase order of $n_s^\mu \in \{0, \ldots, N_{subframe}^{slots,\mu}-1\}$ in the subframe and numbered in an increase order of $n_{s,f}^\mu \in \{0, \ldots, N_{frame}^{slots,\mu}-1\}$ in the radio frame. One slot is constituted by $N_{symb}^\mu$ consecutive OFDM symbols and $N_{symb}^\mu$ is determined according to numerology and a slot configuration used. The start of slot $n_s^\mu$ in the subframe is temporally aligned with the start of OFDM symbol $s_s^\mu N_{symb}^\mu$ in the same subframe.

All UEs may not simultaneously perform transmission and reception and this means that all OFDM symbols of a downlink slot or an uplink slot may not be used.

Table 2 shows the number of OFDM symbols for each slot ($N_{symb}^{slot}$), the number of slots for each radio frame ($N_{slot}^{frame,\mu}$), and the number of slots for each subframe ($N_{slot}^{subframe,\mu}$) in a normal CP and Table 3 shows the number of OFDM symbols for each slot, the number of slots for each radio frame, and the number of slots for each subframe in an extended CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 6 illustrates an example of a frame structure in an NR system. FIG. 6 is just for convenience of the description and does not limit the scope of the present disclosure.

In the case of Table 3, as an example of a case where μ=2, i.e., a case where a subcarrier spacing (SCS) is 60 kHz, one subframe (or frame) may include four slots by referring to Table 2 and as an example, a case of one subframe={1,2,4} slots is illustrated in FIG. 3 and the number of slot(s) which may be included in one subframe may be defined as shown in Table 2.

Further, a mini-slot may be constituted by 2, 4, or 7 symbols and constituted by more or less symbols.

With respect to the physical resource in the NR system, an antenna port, a resource grid, a resource element, a resource block, a carrier part, and the like may be considered.

Hereinafter, the physical resources which may be considered in the NR system will be described in detail.

First, with respect to the antenna port, the antenna port is defined so that a channel in which the symbol on the antenna port is transported may be inferred from a channel in which different symbols on the same antenna port are transported.

When a large-scale property of a channel in which a symbol on one antenna port is transported may be interred from a channel in which symbols on different antenna ports are transported, two antenna ports may have a quasi co-located or quasi co-location (QC/QCL) relationship. Here, the large-scale property includes at least one of a delay spread, a Doppler spread, a frequency shift, average received power, and a received timing.

FIG. 7 illustrates an example of a resource grid supported by a wireless communication system to which a method proposed by the present disclosure is applicable.

Referring to FIG. 7, it is exemplarily described that the resource grid is constituted by $N_{RB}^{\mu} N_{sc}^{RB}$ subcarriers on the frequency domain and one subframe is constituted by $14 \cdot 2\mu$ OFDM symbols, but the present disclosure is not limited thereto.

In the NR system, the transmitted signal is described by one or more resource grids constituted by $N_{RB}^{\mu} N_{sc}^{RB}$ subcarriers and $2^{\mu} N_{symb}^{(\mu)}$ OFDM symbols. Here, $N_{RB}^{\mu} \leq N_{RB}^{max, \mu}$. The $N_{RB}^{max, \mu}$ may represent a maximum transmission bandwidth and this may vary even between uplink and downlink in addition to numerology.

In this case, as illustrated in FIG. 8, one resource grid may be configured for each numerology $\mu$ and antenna port p.

FIG. 8 illustrates examples of a resource grid for each antenna port and numerology to which a method proposed by the present disclosure is applicable.

Each element of the resource grids for the numerology $\mu$ and the antenna port p is referred to as the resource element and uniquely identified by an index pair (k,l). Here, $k=0, \ldots, N_{RB}^{\mu} N_{sc}^{RB}-1$ represents the index on the frequency domain and $\bar{l}=0, \ldots, 2^{\mu} N_{symb}^{(\mu)}-1$ represents the location of the symbol in the subframe. When the resource element is referred to in the slot, the index pair (k,l) is used. Here, $l=0, \ldots, N_{symb}^{\mu}-1$.

The resource element $\mu$ for the numerology (k,$\bar{l}$) and the antenna port p corresponds to a complex value $a_{k,\bar{l}}^{(p,\mu)}$. When there is no risk of confusion or when a specific antenna port or numerology is not specified, the indexes p and $\mu$ may be dropped, and as a result, the complex value may become $a_{k,\bar{l}}^{(p)}$ or $a_{k,\bar{l}}$.

Further, the physical resource block is defined as $N_{sc}^{RB}=12$ consecutive subcarriers on the frequency domain.

Point A may serve as a common reference point of a resource block grid and may be acquired as follows.

OffsetToPointA for PCell downlink indicates the frequency offset between the lowest subcarrier of the lowest resource block superposed with the SS/PBCH block used by the UE for initial cell selection and point A, and is expressed by resource block units assuming a 15 kHz subcarrier spacing for FR1 and a 60 kHz subcarrier spacing for FR2; and absoluteFrequencyPointA indicates the frequency-position of point A expressed as in an absolute radio-frequency channel number (ARFCN).

Common resource blocks are numbered upwards from 0 in the frequency domain for a subcarrier spacing setting $\mu$.

A center of subcarrier 0 for common resource block 0 for the subcarrier spacing setting $\mu$ coincides with 'point A'. The resource element (k,l) for common resource block number $n_{CRB}^{\mu}$ and the subcarrier spacing setting $\mu$ in the frequency domain may be given as in Equation 1 below.

$$n_{CRB}^{\mu} = \left\lfloor \frac{k}{N_{sc}^{RB}} \right\rfloor \quad \text{[Equation 1]}$$

Here, k may be relatively defined in point A so that k=0 corresponds to a subcarrier centering on point A. Physical resource blocks are numbered with 0 to $N_{BWP, i}^{size}-1$ in a bandwidth part (BWP) and i represents the number of the BWP. A relationship between the physical resource block $n_{PRB}$ and the common resource block $n_{CRB}$ in BWP i may be given by Equation 2 below.

$$n_{CRB} = n_{PRB} + N_{BWP, i}^{start} \quad \text{[Equation 2]}$$

Here, $N_{BWP, i}^{start}$ may be a common resource block in which the BWP relatively starts to common resource block 0. Physical resource blocks are numbered with 0 to $N_{BWP, i}^{size}-1$ in a bandwidth part (BWP) and i represents the number of the BWP.

Self-Contained Structure

A time division duplexing (TDD) structure considered in the NR system is a structure in which both uplink (UL) and downlink (DL) are processed in one slot (or subframe). This is to minimize the latency of data transmission in the TDD system and the structure may be referred to as a self-contained structure or a self-contained slot.

FIG. 9 illustrates one example of a self-contained structure to which a method proposed by the present disclosure is applicable. FIG. 9 is just for convenience of the description and does not limit the scope of the present disclosure.

Referring to FIG. 9, it is assumed that one transmission unit (e.g., slot or subframe) is constituted by 14 orthogonal frequency division multiplexing (OFDM) symbols as in legacy LTE.

In FIG. 9, a region 902 refers to a downlink control region and a region 904 refers to an uplink control region. Further, regions (that is, regions without a separate indication) other than the regions 902 and 904 may be used for transmitting downlink data or uplink data.

That is, uplink control information and downlink control information may be transmitted in one self-contained slot. On the contrary, in the case of data, uplink data or downlink data may be transmitted in one self-contained slot.

When the structure illustrated in FIG. 9 is used, in one self-contained slot, downlink transmission and uplink transmission may sequentially proceed and transmission of the downlink data and reception of uplink ACK/NACK may be performed.

Consequently, when an error of data transmission occurs, a time required for retransmitting data may be reduced. Therefore, latency associated with data transfer may be minimized.

In the self-contained slot structure illustrated in FIG. 9, a time gap for a process of switching from a transmission mode to a reception mode in a base station (eNodeB, eNB, or gNB) and/or a terminal (user equipment (UE)) or a process of switching from the reception mode to the transmission mode is required. In association with the time gap, when the uplink transmission is performed after the downlink transmission in the self-contained slot, some OFDM symbol(s) may be configured as a guard period (GP).

Analog Beamforming

In the millimeter wave (mmW), the wavelength is shortened, so that a plurality of antenna elements can be installed in the same area. That is, a total of 100 antenna elements can be installed in a 2-dimension array at a 0.5 lambda (wavelength) interval on a panel of 5 by 5 cm with a wavelength of 1 cm in a 30 GHz band. Therefore, in the mmW, it is possible to increase a beamforming (BF) gain to increase coverage or increase throughput by using multiple antenna elements.

In this case, if a transceiver unit (TXRU) is provided so that transmission power and phase may be adjusted for each antenna element, independent beamforming is possible for each frequency resource. However, when the TXRUs are installed on all 100 antenna elements, there is a problem that effectiveness is deteriorated in terms of costs. Therefore, a scheme of mapping multiple antenna elements to one TXRU and adjusting a direction of a beam using an analog phase shifter is considered. Such an analog beamforming scheme has a disadvantage in that frequency selective beamforming may not be performed by making only one beam direction in all bands.

A hybrid BF with B TXRUs, which is an intermediate form of digital BF and analog BF, and fewer than Q antenna elements, may be considered. In this case, although there is a difference depending on a connection scheme of B TXRUs and Q antenna elements, the number of directions of the beams that may be transmitted at the same time is limited to B or less.

Discontinuous Reception (DRX) for Paging

The UE may use Discontinuous Reception (DRX) in an idle mode in order to reduce power consumption. One paging occasion (PO) may be a subframe having P-RNTI transmitted through PDCCH or MPDCCH handling a paging message. In the P-RNTI transmitted on the MPDCCH, the PO represents a start subframe of MPDCCH repetitions.

One paging frame (PF) may mean one frame which may include one or more paging occasion(s). When the DRX is used, the UE needs to monitor only one PO per DRX cycle.

One paging narrowband (PNB) may mean one narrowband in which the UE receives the paging message.

The PF, the PO, and the PNB may be determined based on the DRX parameters provided in the system information.

The PF is given by Equation 3 below.

$$SFN \bmod T = (T \text{ div } N) * (UE\_ID \bmod N), \quad \text{[Equation 3]}$$

Here, Index i_s indicating the PO in a subframe pattern defined in a predefined standard may be derived by Equation 4 below.

$$i\_s = \text{floor}(UE\_ID/N) \bmod Ns \quad \text{[Equation 4]}$$

When the P-RNTI is monitored in the MPDCCH, the PNB may be determined by Equation 5 below.

$$PNB = \text{floor}(UE\_ID/(N*Ns)) \bmod Nn \quad \text{[Equation 5]}$$

DRX parameters stored in a System Information (SI) UE should be able to be locally updated by the UE whenever a DRX parameter value is changed in the SI. When the UE does not have the IMSI, for example, when an emergency call is made without the USIM, the UE should be able to use UE_ID=0 as a default identity in the PF, i_s, and PNB equation.

The following parameters may be used for calculation of PF, i_s, and PNB.

T: DRX cycle of UE. When UE specific extended DRX values of 512 radio frames are set by the higher layer according to the predefined standard, T may be 512. Otherwise, if T is allocated by the higher layer, T may be determined by a minimum value among the UE specific DRX values and determined by a default DRX value broadcasted in the system information. When the UE specific DRX is not set by the higher layer, the default value may be applied.

nB: 4T, 2T, T, T/2, T/4, T/8, T/16, T/32

N: min(T, nB)

Ns: max(1, nB/T)

Nn: Number of paging narrowbands provided to system information

UE_ID:

When the P-RNTI is monitored in the PDCCH, IMSI mod 1024.

When the P-RNTI is monitored in the MPDCCH, IMSI mod 16384.

The IMSI is provided as an integer (0 . . . 9) type sequence of digit, and the IMSI should be interpreted as a decimal integer in the above equation, and a first digit provided in the sequence may represent the most significant digit.

For example, the IMSI is represented as follows.

IMSI=12 (digit1=1, digit2=2)

In the operation, this may be interpreted as not "1×16+2=18" but a decimal integer "12".

Subframe Patterns

In the case of FDD, and when the P-RNTI is transmitted on the PDCCH or the P-RNTI is transmitted on an MPDCCH having a system bandwidth >3 MHz, the subframe patterns may be shown in Table 4 below.

TABLE 4

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

In the case of the FDD, and when the P-RNTI is transmitted on an MPDCCH having a system bandwidth of 1.4 MHz and 3 MHz, the subframe patterns may be shown in Table 5 below.

TABLE 5

| Ns | PO when i_s = 0 | PO when i_s = 1 | PO when i_s = 2 | PO when i_s = 3 |
|---|---|---|---|---|
| 1 | 5 | N/A | N/A | N/A |
| 2 | 5 | 5 | N/A | N/A |
| 4 | 5 | 5 | 5 | 5 |

In the case of TDD (all UL/DL configurations), and when the P-RNTI is transmitted on the PDCCH or the P-RNTI is transmitted on the MPDCCH having the system bandwidth >3 MHz, the subframe patterns may be shown in Table 6 below.

TABLE 6

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

In the case of the TDD, and when the P-RNTI is transmitted on the system bandwidth of 1.4 MHz and 3 MHz, the subframe patterns may be shown in Table 7 below.

TABLE 7

| Ns | PO when i_s = 0 | PO when i_s = 1 | PO when i_s = 2 | PO when i_s = 3 |
|---|---|---|---|---|
| 1 | 1 | N/A | N/A | N/A |
| 2 | 1 | 6 | N/A | N/A |
| 4 | 1 | 1 | 6 | 6 |

Paging in Extended DRX

The UE may be configured by a higher layer having an Extended DRX (eDRX) cycle TeDRX. Only when the cell indicates support for the eDRX in the system information, the UE may operate in the extended DRX.

When the UE is configured to a TeDRX cycle of 512 radio frames, the UE may monitor the PO as described in a standard predefined as parameter T=512. Otherwise, the UE configured to the eDRX may monitor POs for an earlier time of during a periodic paging time window (PTW) configured for the UE or until a paging message is received for the UE during a paging message including an NAS identity of the UE during the PTW as described in the predefined standard (i.e., based on a higher layer configuration DRX value and a default DRX value). The PTW may be UE specific, and may be determined by a Paging Hyperframe (PH), and a start position (PTW_start) and an end position (PTW_end) in the PH. The PH, the PTW_start, and the PTW_end may be given by the following equation.

The PH may be H-SFN satisfying Equation 6 below.

$$H\text{-}SFN \bmod TeDRX, H = (UE\_ID \bmod TeDRX, H) \quad \text{[Equation 6]}$$

Here,

UE_ID: IMSI mod 1024

T eDRX, H: may be configured by the eDRX cycle (TeDRX, H=1, 2, . . . , 256 hyperframes) and the higher layer of the UE in the hyperframe.

The PTW_start may be a part of the PTW and may mean a first radio frame in which the SFN satisfies the following equation.

$$SFN = 256 * ieDRX, \text{ here,}$$

ieDRX=floor (UE_ID/TeDRX,H)mod 4

The PTW_end may be a last radio frame of the PTW and the SFN may satisfy Equation 7 below.

$$SFN = (PTW\_start + L * 100 - 1) \bmod 1024, \quad \text{[Equation 7]}$$

Here,

L=Paging Time Window length configured by higher layer (seconds)

As more and more communication devices demand a larger communication capacity, efficient utilization of a limited frequency band in a next wireless communication system becomes an increasingly important requirement.

A method is being considered, in which a cellular communication system such as an LTE/NR system also uses unlicensed bands such as a 2.4 GHz band primarily used by the legacy WiFi system or unlicensed bands such as 5/6 GHz and 60 GHz bands that are newly attracting public attentions for traffic offloading. Basically, since a wireless transmission/reception scheme through a contention between respective communication nodes is assumed in the unlicensed band, each communication node requests checking that another communication node does not transmit the signal by performing channel sensing before transmitting the signal.

For convenience, such an operation is referred to as listen before talk (LBT) or channel access procedure (CAP), and in particular, an operation of checking whether another communication node transmits the signal is referred to as carrier sensing (CS), and a case of determining that another communication does not transmit the signal is defined as confirming clear channel assessment (CCA). In the present disclosure the LBT or CAP operation may follow technical contents of a predefined standard (e.g., TS37.213, section 4.1, or section 4.2) from the viewpoint of the base station or the UE.

Furthermore, in the present disclosure, the success in the LBT or CAP may mean that the LBT or CAP operation is completed at the time when the base station or the UE wants to start transmission and the fail in the LBT or CAP may mean that the LBT or CAP operation is not completed at the time when the base station or the UE wants to start transmission.

The base station (e.g., eNB, gNB) or the user equipment (UE) in the LTE/NR system should also perform the LBT for signal transmission in the unlicensed band (for convenience, referred to as U-band) and when the base station (e.g., eNB) or the UE in the LTE/NR system transmits the signal, other communication nodes such as WiFi should not also cause interference by performing the LBT.

For example, in a Wi-Fi standard (801.11ac), a CCA threshold is specified as −62 dBm for a non-Wi-Fi signal and specified as −82 dBm for a Wi-Fi signal. This means that when the STA or AP transmits a signal other than WiFi with power of −62 dBm or more, the STA or AP does not transmit the signal so as not to cause interference.

The present disclosure proposes a method of configuring the paging occasion (PO) in NR on unlicensed bands (NR-U).

In the NR-U as a process of checking whether occupancy of the channel occurs when there is data to be first transmitted, the LBT is performed. According to a result of performing the LBT, a synchronization signal may be transmitted at an original appointed or defined time or a delay may occur due to the LBT fail. In the case of paging of the NR system, since the location of the PO is not continuously fixed but varies according to the DL/UL configuration unlike LTE, a scheme of directly configuring first PDCCH monitoring of each PO is discussed. Through this, it can be seen that the location of the PO is not fixed, but the number of POs for each PF has a predetermined pattern unlike the LTE. In other words, it can be seen that even though the location of the PO which exists in each paging frame (PF) may vary at each time of transmitting information regarding the paging, the number of POs for each PF has the predetermined pattern. When this is applied to the use of the LBT in the NR-U system, it can be seen that the base station should perform the LBT before transmitting the PDCCH for the paging every time.

Therefore, the present disclosure proposes a method of consecutively configuring the paging burstly in order to minimize the number of LBT times or increase a paging transmission probability (hereinafter, referred to as a first embodiment) and a method for fair scheduling between UE groups at this time (hereinafter, referred to as a second embodiment).

When the paging is configured in the NR-U system through the proposed method in the present disclosure, a problem of resource consumption not required for paging transmission/reception due to the LBT performed due to unlicensed BW characteristics and a scheduling problem which occurs due to latency may be solved.

FIG. 10 is a diagram illustrating a most general proposed method. The base station performs the LBT for transmitting the synchronization signal and transmits an actual synchronization signal (SS) and/or physical broadcast channel (PBCH) block when the LBT is successful, and configures the PO through remaining minimum system information (RMSI). In this case, the PDSCH through which the paging message (or paging) is transmitted may be contiguous with the PDCCH as illustrated in FIG. 10(A) and transmitted through a downlink (DL) resource at an arbitrary point in the form of a cross slot as illustrated in FIG. 10(B). When the PO is configured through the corresponding scheme, if there is no gap between the SS and/or PBCH block (hereinafter, referred to as SS/PBCH block) and/or a PDCCH and/or PDSCH for transmitting the RMSI and transmitting the paging message, the base station may perform the LBT and then transfer paging information without separate LBT for each PO after transmitting the SS/PBCH block and/or RMSI.

Hereinafter, the embodiments described in the present disclosure are only classified for convenience of description and it is needless to say that some methods and/or some configurations of any one embodiment may be substituted with the method and/or configuration of another embodiment or may be applied in combination with each other.

Furthermore, hereinafter, a slot, a subframe, a frame, etc., mentioned in the embodiments described in the present disclosure may correspond to specific examples of predetermined time units used in the wireless communication system. That is, in applying the methods proposed in the present disclosure, the time unit or the like may be substituted with other time units applied in another wireless communication system, and applied.

Hereinafter, the proposed method in the present disclosure will be described in detail.

First Embodiment

First, the method of consecutively configuring the POs in order to minimize the number of LBT times will be described in detail.

When considering the NR-U operation in which the base station may transmit the paging message only when succeeding in the LBT, the first embodiment allows the UE and the base station to efficiently use the resource without giving overload in exchanging the corresponding paging information.

Hereinafter, the first embodiment will be divided into a method of configuring a burst PO in multiple PFs (hereinafter, referred to as method 1), a method of configuring multiple POs in one DRX cycle (hereinafter, referred to as method 2), a method of configuring POs with relative location information for a transmission location of the SS/PBCH block (hereinafter, referred to as method 3), and a method of configuring the PO considering an absolute PO location for LBT success or fail, and described.

Hereinafter, methods to be described are just classified for convenience and it is needless to say that the configuration of any one method may be substituted with the configuration of another method or may be applied in combination with each other.

(Method 1)

First, the method of configuring the burst PO in multiple PFs will be described.

The corresponding method is a method of dividing each DRX cycle into multiple specific duration or multiple paging frame (PF) bundling units and burstly transmitting the POs within the corresponding duration.

The corresponding method is a method of consecutively K*Ns POs in K PF sets by considering K PFs as one PO group transmission unit when the maximum number of POs transmittable to be available within a single PF (10 ms) is Ns.

In the corresponding method, when the POs are distributed within the PF unit, the LBT should be performed before each PO, so resources consumed for the LBT may be saved by consecutively sending the POs. In this case, the DRX cycle is an integer multiple of K PF sets. The base station transmits information regarding multiple PF bundling units through an RRC message and configures the number of POs which exist in multiple PFs.

In this case, first PDCCH monitoring of each PO may be explicitly known by using a bitmap similarly as in the NR and each UE may attempt wake-up at the location of the corresponding PO. Alternatively, since the PO is burstly configured, a PDCCH monitoring window of a PO positioned first in all multiple PFs instead of the first of each PO may be designated and known.

In this case, the UE may calculate the PO thereof by the number of SS/PBCH blocks actually transmitted and the DL/UL configuration based on the first PDCCH monitoring window. The PO in the corresponding case is available when the PDCCH and/or the PDSCH are/is received in one slot. The base station transmits a total DRX cycle and information for bundling units of multiple PFs (1, 2, 4, 8, . . . , T/K) and the maximum number of POs or the total number of POs which exist in multiple corresponding PFs as the RRC message, and the UE is directly designated with the PO location thereof or calculates the PO location. FIG. 11 is a diagram illustrating the corresponding method. The corresponding method is a scheme in which when one PO comes every 10 ms within the original DRX cycle, four POs are transmitted within a first PF in units of 40 ms. In the case of FIG. 11(A), the LBT may be performed four times before transmitting the PO for the PO of PF 0/1/2/3, but when the PO is consecutively transmitted as in the above-described method (FIG. 11(B)), only one consecutive LBT is required, thereby reducing waste of resources.

And/or, the corresponding method is the same as a legacy method in which the 10 ms-unit PF is bundled into a bundling unit (PF set) and the PO is burstly transmitted. An example of the corresponding method is illustrated in FIG. 12. In this case, the corresponding method is a scheme of defining PF set information as a factor (½T, ¼T, ⅛T, 1/16T, etc.) of the DRX cycle and burstly transmitting the POs within the corresponding redefined PF in sequence. When the corresponding configuration is followed, the base station configures the DRX cycle, a PF set size, the total number of POs, and the first PDCCH monitoring window through the RRC message, and a process in which the UE and the base station transmit and receive the paging is the same as the scheme described with reference to FIG. 11.

And/or, there is a PF corresponding to one radio frame, and when multiple PFs may be configured within one DRX cycle, multiple POs may be configured within one PF even in a case where a cycle between PFs is configured to be more than 10 msec. In this case, the POs in one PF may be consecutively configured without a symbol gap.

(Method 2)

Next, a method of configuring multiple POs within one DRX cycle will be described.

In Method 1 described above, when a delay of paging transmission of the base station occurs due to the LBT fail, a specific UE group may not receive the paging and after transitioning to a sleep mode again up to the next DRX cycle, the specific UE group receives the wake-up. Accordingly, UE groups close to whether the LBT is performed or the time when the LBT is performed may not frequently receive the paging. In other words, UE groups close to the LBT may not frequently receive the paging due to the LBT fail.

In Method 2, the PO is configured based on Method 1, but the problem is solved by using indexing of the PO or a scheduling scheme between PO groups. In Method 1, transmission of paging information regarding different paging groups for all POs is presupposed. Method 2 is a scheme of giving multiple POs by considering the LBT fail to the corresponding POs. Hereinafter, Method 2 will be described in detail.

In Method 1, different PO groups are configured for consecutive PF sets. In this case, there may be a PO group that is not capable of receiving the paging due to the LBT fail. Therefore, Method 2 is a scheme of not scheduling different paging groups for each PF set but transmitting the paging information to the same group for each set. Compared with Method 1, a capacity may be reduced, but reliability may be obtained. That is, Method 2 is a scheme of transmitting the same PO to Paging group #0 four times in PF set #0 and transmitting the same PO to Paging group #1 in PF set #1. The base station transmits only a single PO after the time of the LBT success and first transmits the PO of a next PF set in sequence. The UE group may wake up or read the first PO among the same POs transmitted in the set or first perform the wake-up from locations of second and third POs other than the first PO by considering the LBT fail. That is, the UE may unconditionally perform the wake-up in the second and third POs other than the first PO by considering the LBT fail. The base station may give offset information for the corresponding PO and use the given offset information at the time when the UE wakes up.

And/or, multiple POs may be transmitted and received by configuring a repetition cycle. A repetition cycle corresponding to 1/M of the DRX cycle is defined and the corresponding repetition cycle should satisfy an integer multiple of the PF, and the base station transmits the paging information for PO groups which are previously transmitted at the repetition cycle again. In this case, against occurrence of the LBT between burst POs, the repetition cycle is shuffled between the UE groups, so that a wake-up timing between the PO groups may vary for each repetition cycle. That is, a last PO constituting a burst set is positioned at the front in a next round.

In this case, the base station transmits the paging by using PO-unit sequential transmission or beam-unit available PDCCH monitoring after the LBT success, and transmits the paging information only for PO groups which are not transmitted due to the LBT fail at a next repetition cycle. The corresponding unit may also be made by a beam unit. In regard to a basic operation of the UE, the UE wakes up in order to receive the paging at a first repetition cycle and when the UE is not capable of receiving the paging at this time, the UE attempts to obtain the corresponding information in a PO within the next repetition cycle. In this case, the UE may maintain a wake-up state and repeat sleep/wake up). When the UE receives the paging, the UE does not read the paging in the PO of the next repetition cycle. However, when the UE does not receive the paging except for a case where there is no ID of the UE in spite of receiving the paging regardless of the repetition cycle, the UE transitions to a sleep mode up to the next DRX cycle.

Furthermore, even though the base station does not transmit the paging message because there is no paging message, the UE may not recognize this situation and should be able to perform the wake-up in the PO of every repetition cycle.

As a method for preventing this, the base station transfers an indicator indicating whether the LBT is successful (or whether the LBT is successful or not) in the PDCCH monitoring window or performs the wake-up in a next PO according to the paging message or whether to detect the DM-RS.

The corresponding method is illustrated in FIG. 13, and when the PO is configured through the corresponding scheme, information regarding the number of repetition cycles should be transmitted while being included in paging occasion (PO) information.

And/or, as a modification of the above-described scheme, the paging information is transmitted to multiple groups in each PF set, but multiple POs may be assigned for each group. As one example, in respect to four POs configured in PF set #(T/4*0) of FIG. 12, PO #0/2 may be associated with the same UE group #0 and PO #1/3 may be associated with the same UE group #1. The base station may transmit only PO #1/2 in corresponding PF set #(T/4*0) when the LBT is successful from PO #1. A UE that belongs to UE group #0 performs PDCCH monitoring in order to receive the paging in PO #0, but the UE does not discover the PDCCH and will perform the PDCCH monitoring again in PO #2 and a UE that belongs to UE group #1 may perform the PDCCH monitoring in order to receive the paging in PO #1.

As such, POs for multiple UE groups are repeatedly transmitted in an interleaving form in the PF set, and as a result, fair scheduling is possible. In other words, when the LBT is unsuccessful, since there is a high probability that the corresponding channel will be occupied even in a next stage (or PF set), the POs are interleaved and repeatedly configured in the PF set, thereby implementing the fair scheduling.

As another example, in respect to four POs configured in PF set #(T/4*0) of FIG. 12, PO #0/1 may be associated with the same UE group #0, PO #1/2 may be associated with the same UE group #1, and PO #2/3 may be associated with the same UE group #2.

The base station may transmit only PO #1/2/3 (corresponding to UE group #0/1/2, respectively) in corresponding PF set #(T/4*0) when the LBT is successful from PO #1. The UE that belongs to UE group #0 performs PDCCH monitoring in order to receive the paging in PO #0, but the UE does not discover the PDCCH and will perform the PDCCH monitoring again in PO #1. The UE that belongs to UE group #1 performs PDCCH monitoring in order to receive the paging in PO #1, but the UE does not discover the PDCCH and will perform the PDCCH monitoring again in PO #2. A UE that belongs to UE group #2 performs PDCCH monitoring in order to receive the paging in PO #2, but the UE does not discover the PDCCH and will perform the PDCCH monitoring again in PO #3.

(Method 3)

Next, a method of configuring POs with relative location information for a transmission location of the SS/PBCH block will be described.

For the SS/PBCH block (or SS/PBCH burst set), even though the LBT is unsuccessful, delay transmission may be allowed within a window having a predetermined duration in order to provide a transmission occasion.

As one example, N (N may be different for each SS/PBCH block) transmission occasions may be given for each SS/PBCH block within an X ms (e.g., X=6), and N transmission candidates for each SS/PBCH block or a time resource location of each candidate within the corresponding window may be predetermined or configured through RRC signaling. Broadcast transmission such as the paging message (and/or system information) may also provide multiple transmission occasions for the same message by considering the LBT fail, and it may be preferable that an actual message is transmitted in (at least) one transmission candidate from the time when the LBT is successful among the multiple transmission occasions.

In the corresponding method, broadcast transmission such as the SS/PBCH block and the paging message (and/or system information) is constituted by one consecutive downlink (DL) transmission burst to increase transmission occasions of the SS/PBCH block and broadcast data.

Specifically, proposed is a method of configuring time axis resource information (or a resource region of the PDCCH) for a PO providing scheduling information for the paging message as the relative location information for the transmission location of the SS/PBCH block. As one example, as illustrated in FIG. 14(A), a symbol spacing between reference symbol indexes (in the corresponding example, a start symbol index of each PO is assumed as a reference symbol index, but a specific symbol of each PO may be configured as the reference symbol index) may be signaled through RRC (e.g., through RMSI) from the reference symbol index (in the corresponding example, the start symbol index of a first SS/PBCH block is assumed as the reference symbol index, but a specific symbol of a specific SS/PBCH block index may be configured as the reference symbol index) which becomes a reference of the SS/PBCH block.

In this case, the UE may calculate a symbol index corresponding to each PO from the reference symbol index (e.g., the first symbol index of the first SS/PBCH block) configured with the specific symbol of the specific SS/PBCH block index after detecting the SS/PBCH block. If the corresponding UE should perform the PDCCH monitoring for the paging message in PO #1, the corresponding UE may perform the PDCCH monitoring after symbol T(1) from the first symbol index of the first SS/PBCH block. As illustrated in FIG. 14(A), if the UE that performs detection while expecting that the SS/PBCH burst set is transmitted does not discover the SS/PBCH block, the UE may attempt detection for the SS/PBCH burst set or the SS/PBCH block again after a time T_s by a predefined rule or configuration as illustrated in FIG. 14(B). When the SS/PBCH burst set or the SS/PBCH block is detected at the corresponding time, the PDCCH monitoring may be performed after the symbol T(1) from the first symbol index of the corresponding detected SS/PBCH burst set. Here, the SS/PBCH burst set may mean an SS and/or PBCH block burst.

In the case of a time axis resource (i.e., symbol index) configured for the PO, the PDCCH monitoring may be performed from the corresponding resource, but the PDCCH monitoring may be performed in a closest downlink resource after the time axis resource configured for the PO among available downlink (DL) resources signaled by DL/UL configuration information (through RRC or L1 signaling).

FIG. 14 illustrates an example in which a timing gap between the POs is allowed, but the PO may be actually configured without the gap between the POs and even though there is the gap between the POs, the corresponding gap may be filled with a PDSCH (carrying the paging) and the POs may be consecutively transmitted without the gap.

In the corresponding method, all POs within the DRX cycle may be configured within one contiguous burst including the SS/PBCH burst set, but a group of specific POs may be transmitted by interlocking with each other for each cycle of the configured SS/PBCH burst set (or corresponding window) within the DRX cycle.

As one example, when the DRX cycle is configured to 160 msec and a transmission cycle of the SS/PBCH burst set (or a window including the same) which may interlock with the PO is configured to 40 msec, a group of different POs may correspond to each of four SS/PBCH burst sets within the DRX cycle. When 20 POs are configured, 5 POs interlock for each cycle of each SS/PBCH burst set, and as a result, the time axis resource information for each PO may be configured as the relative location information for the transmission location of the SS/PBCH block.

In the corresponding method, one PO may mean that the same paging message is beam-swept and transmitted (or repeated transmission of the paging message interlocked with all (actually transmitted) SS/PBCH block indexes) in various beam directions and mean that a paging message interlocked with one specific beam direction (or a specific SS/PBCH block index) is transmitted, but different paging messages for all paging groups linked with the corresponding SS/PBCH burst set are transmitted.

In the corresponding method, offset information between symbol indexes in which a specific symbol of a specific SS/PBCH block index corresponds to each PO from the reference symbol index may include a specific or the same symbol within the same slot.

(Method 4)

Next, a PO configuring method considering an absolute PO location for LBT success or fail will be described.

The corresponding method is a scheme of continuously assigning POs contiguously starting from a PDCCH monitoring window closest to the SS/PBCH block in respect to contiguous POs. The corresponding method is a scheme of configuring the POs contiguously by including a paging message to be originally transmitted in addition to a paging message which is not transmitted due to the LBT when the DRX cycle and periodicity of the SS/PBCH block are the same, the LBT fail of the SS/PBCH block interferes with locations of POs to be originally transmitted (original POs location), original PO locations. In this case, the number of POs as a value larger than Ns(4) which is the maximum number of POs available within a PF unit used in the current NR may have a large value in proportion to the periodicity of the SS/PBCH block, such as 1, 2, 4, 8, 16, 32, etc.

That is, the corresponding method is a scheme in which another downlink and/or uplink (DL/UL) transmission such as the SS/PBCH block is delayed, and as a result, the PO after the locations of the POs to be originally transmitted is additionally assigned to UE groups which do not receive the paging information and the UE transmits and receives the paging at an N-th later PO point by a predetermined appointment. For example, when the SS/PBCH block should be transmitted at the SS/PBCH block location of FIG. 15(A), but is transmitted the SS/PBCH block location of FIG. 15(B) due to the LBT fail, PO #0 and PO #1 not assigned by the corresponding SS/PBCH may be assigned after PO #N−1.

The corresponding method is illustrated in FIG. 15(B). As in the example of Method 1, when transmission of the SS/PBCH block is completed before original POs location #2 at which the SS/PBCH block is to be originally transmitted, the SS/PBCH block is sequentially transmitted similarly up to an N−1-th PO as in Method 1, but additional transmission is thereafter performed for the group that does not receive the paging due to another downlink and/or uplink (DL/UL) transmission such as the above SS/PBCH block.

In this case, the base station should inform the UE of locations of and the number of POs which may be additionally given in addition to the actual number of POs, and when the UE does not receive the SS/PBCH or any data after the wake-up in the original PO as described above, the UE may receive the paging information by waiting without state transition to a sleep mode up to a location of an N-th later PO or receive the paging by waking up in the N-th PO again after the state transition to the sleep mode. In this case, a UE that wakes up at a second candidate PO location then attempts wake-up at an original PO location. This is to prevent indiscriminate waste of resources.

Second Embodiment

Next, a method of bundling POs of the same beam as a set and consecutively configuring the bundled POs will be described.

When a paging PDCCH is transmitted through the above-described method, time intervals between each PO and the synchronization signal (or SS and/or PBCH block) are all different. This means that if synchronization is not made, power consumption used for reading the synchronization signal again and receiving the corresponding paging is different. In this case, as the numbers of beams of the base station and the UE increase, a deviation increases.

In order to solve the corresponding problem, the paging information is not transmitted through beam sweeping for each UE group defined in the legacy NR system, but PDCCH monitoring windows transmitted with the same beam are bundled as one set, and transmitted as illustrated FIG. 16 for respective consecutive POs after the SS/PBCH block.

The corresponding method is applicable to all schemes of the first embodiment, and in this case, the number of POs to be distributed is transmitted by a slot-based and/or non slot-based scheme by considering the PDSCH in which the corresponding paging message is transmitted, but may be configured to be aligned in a slot or a half slot, and the base station (or network) may transmit the corresponding value. Since one set is configured and transmitted with the same beam, fairness may be given between respective groups. Since unfairness may also remain between the POs constituting the set with the same beam and the subsequently transmitted POs in order to make the alignment, the corresponding problem may be solved when the groups are configured to be shuffled during transmission every SS/PBCH block.

For example, POs 0, 1, and 2 of FIG. 16(A) may be bundled for each beam and consecutively transmitted for each same beam as illustrated in FIG. 16(B). As illustrated in FIG. 16(B), when POs 0, 1, and 2 are bundled for each beam and transmitted as one set form, the PDCCHs of POs 3, 4, and 5 are sequentially transmitted for each same beam like the previous POs. Thereafter, at the time of transmitting the next SS/PBCH block, the previous POs 3, 4, and 5 are transmitted to POs 0, 1, and 2 adjacent to the SS/PBCH block and POs 0, 1, and 2 previously transmitted adjacent to the SS/PBCH block are transmitted in the PDCCH monitoring windows of POs 3, 4, and 5. The beam may give the fairness between the UE groups through the corresponding method and when there is a UE which is to receive the paging, the resources may be more efficiently used.

FIG. 17 is a flowchart for describing an operation method of a user equipment (UE) proposed by the present disclosure.

Referring to FIG. 17, a UE (1000/2000 in FIGS. 19 to 22) may receive, from a base station (1000/2000 in FIGS. 19 to 22), paging occasion (PO) configuration information including paging frame (PF) set information (S1701).

For example, an operation in which the UE in step S1701 receives the PO configuration information from the base station may be implemented by apparatuses in FIGS. 19 to 22 to be described below. For example, referring to FIG. 20, one or more processors 1020 may control one or more memories 1040 and/or one or more RF units 1060 so as to receive the PO configuration information and one or more RF units 1060 may receive the PO configuration information from the base station.

Next, the UE (1000/2000 in FIGS. 19 to 22) may receive, from the base station (1000/2000 in FIGS. 19 to 22), control information related to a paging based on the PO configuration information (S1702). For example, the control information related to the paging may include Paging (P)-Radio Network Temporary Identifier (RNTI) or may be Downlink Control Information (DCI) or physical downlink control channel scrambled to the P-RNTI. The control information may include information on an allocation resource of the paging message. The control information may be received in a PO.

An SS and/or PBCH block (or SS and/or PBCH block burst) may be configured before POs.

For example, an operation in which the UE in step S1702 receives the control information related to the paging from the base station may be implemented by the devices in FIGS. 19 to 22 to be described below. For example, referring to FIG. 20, one or more processors 1020 may control one or more memories 1040 and/or one or more RF units 1060 so as to receive the control information related to the paging and one or more RF units 1060 may receive the control information related to the paging from the base station.

Next, the UE (1000/2000 in FIGS. 19 to 22) may receive, from the base station (1000/2000 in FIGS. 19 to 22), a paging message based on the control information (S1703). The paging message scheduled by the control information may be received in the same slot as the control information. Alternatively, the paging message scheduled by the control information may be received in a different slot from the control information.

In particular, the PF set information may be information for bundling of PFs (or information related to bundling of the PFs) and POs related to the PFs may be consecutively configured in a time domain. The PF set information may be defined as a factor of a discontinuous reception (DRX) cycle. And/or, the POs may be consecutively configured in a first PF among the PFs.

A Listen Before Talk (LBT) operation for the POs is performed before a first PO among the POs.

And/or, the PO configuration information may further include information for a repetition cycle and the POs may be configured repeatedly at the repetition cycle within the discontinuous reception (DRX) cycle. Further, the repeated POs may be shuffled and configured.

For example, an operation in which the UE in step S1703 receives the paging message based on the control information from the base station may be implemented by the devices in FIGS. 19 to 22 to be described below. For example, referring to FIG. 20, one or more processors 1020 may control one or more memories 1040 and/or one or more RF units 1060 so as to receive the paging message based on the control information and one or more RF units 1060 may receive the paging message based on the control information from the base station.

The operation method of the UE described by referring to FIG. 17 is the same as the operation method (e.g., the first and second embodiments) of the UE described by referring to FIGS. 1 to 22, so other detailed description will be omitted.

The signaling and operation may be implemented by the devices (e.g., FIGS. 19 to 22) to be described below. For example, the signaling and operation may be processed by one or more processors 1010 and 2020 of FIGS. 19 to 22 and the signaling and operation may be stored in memories (e.g., 1040 and 2040) in the form of an instruction/program (e.g., instruction or executable code) for driving at least one processor (e.g., 1010 and 2020) of FIGS. 19 to 22.

FIG. 18 is a flowchart for describing an operation method of a base station (BS) proposed by the present disclosure.

Referring to FIG. 18, a base station (1000/2000 in FIGS. 19 to 22) may transmit, to a UE (1000/2000 in FIGS. 19 to 22), paging occasion (PO) configuration information including paging frame (PF) set information (S1801).

For example, an operation in which the base station in step S1801 transmits the PO configuration information to the UE may be implemented by devices in FIGS. 19 to 22 to be described below. For example, referring to FIG. 20, one or more processors 2020 may control one or more memories 2040 and/or one or more RF units 2060 so as to transmit the PO configuration information and one or more RF units 2060 may transmit the PO configuration information to the UE.

Next, the base station (1000/2000 in FIGS. 19 to 22) may transmit, to the UE (1000/2000 in FIGS. 19 to 22) control information related to a paging based on the PO configuration information (S1802). For example, the control information related to the paging may include Paging (P)-Radio Network Temporary Identifier (RNTI) or may be Downlink Control Information (DCI) or physical downlink control channel scrambled to the P-RNTI. The control information may include information on an allocation resource of the paging message. The control information may be received in a PO.

An SS and/or PBCH block (or SS and/or PBCH block burst) may be configured before POs.

For example, an operation in which the base station in step S1802 transmits the control information related to the paging based on the PO configuration information to the UE may be implemented by devices in FIGS. 19 to 22 to be described below. For example, referring to FIG. 20, one or more processors 2020 may control one or more memories 2040 and/or one or more RF units 2060 so as to transmit the control information related to the paging based on the PO configuration information and one or more RF units 2060 may transmit the PO configuration information control information related to the paging based on the PO configuration information to the UE.

Next, the base station (1000/2000 in FIGS. 19 to 22) may transmit, to the UE (1000/2000 in FIGS. 19 to 22), a paging message based on the control information (S1803). The paging message scheduled by the control information may be received in the same slot as the control information. Alternatively, the paging message scheduled by the control information may be transmitted in a different slot from the control information.

In particular, the PF set information may be information for bundling of PFs (or information related to bundling of the PFs) and POs related to the PFs may be consecutively configured in a time domain. The PF set information may be defined as a factor of a discontinuous reception (DRX) cycle. And/or, the POs may be consecutively configured in a first PF among the PFs.

A Listen Before Talk (LBT) operation for the POs is performed before a first PO among the POs.

And/or, the PO configuration information may further include information for a repetition cycle and the POs may be configured repeatedly at the repetition cycle within the discontinuous reception (DRX) cycle. Further, the repeated POs may be shuffled and configured.

For example, an operation in which the base station in step S1803 transmits the paging message based on the control information to the UE may be implemented by devices in FIGS. 19 to 22 to be described below. For example, referring to FIG. 20, one or more processors 2020 may control one or more memories 2040 and/or one or more RF units 2060 so as to transmit the paging message based on the control information and one or more RF units 1060 may transmit the paging message based on the control information to the UE.

The operation method of the base station described by referring to FIG. 18 is the same as the operation method (e.g., the first and second embodiments) of the base station described by referring to FIGS. 1 to 22, so other detailed description will be omitted.

The signaling and operation may be implemented by the devices (e.g., FIGS. 19 to 22) to be described below. For example, the signaling and operation may be processed by one or more processors 1010 and 2020 of FIGS. 19 to 22 and the signaling and operation may be stored in memories (e.g., 1040 and 2040) in the form of an instruction/program (e.g., instruction or executable code) for driving at least one processor (e.g., 1010 and 2020) of FIGS. 19 to 22.

Example of Communication System to which Present Disclosure is Applied

Although not limited thereto, but various descriptions, functions, procedures, proposals, methods, and/or operation flowcharts of the present disclosure, which are disclosed in this document may be applied to various fields requiring wireless communications/connections (e.g., 5G) between devices.

Hereinafter, the communication system will be described in more detail with reference to drawings. In the following drawings/descriptions, the same reference numerals will refer to the same or corresponding hardware blocks, software blocks, or functional blocks if not differently described.

FIG. 19 illustrates a communication system 10 applied to the present disclosure.

Referring to FIG. 19, a communication system 10 applied to the present disclosure includes a wireless device, a base station, and a network. Here, the wireless device may mean a device that performs communication by using a wireless access technology (e.g., 5G New RAT (NR) or Long Term Evolution (LTE)) and may be referred to as a communication/wireless/5G device. Although not limited thereto, the wireless device may include a robot 1000a, vehicles 1000b-1 and 1000b-2, an eXtended Reality (XR) device 1000c, a hand-held device 1000d, a home appliance 1000e, an Internet of Thing (IoT) device 1000f, and an AI device/server 4000. For example, the vehicle may include a vehicle with a wireless communication function, an autonomous driving vehicle, a vehicle capable of performing inter-vehicle communication, and the like. Here, the vehicle may include an Unmanned Aerial Vehicle (UAV) (e.g., drone). The XR device may include an Augmented Reality (AR)/Virtual Reality (VR)/Mixed Reality (MR) device and may be implemented as a form such as a head-mounted device (HMD), a head-up display (HUD) provided in the vehicle, a television, a smart phone, a computer, a wearable device, a home appliance device, digital signage, a vehicle, a robot, etc. The hand-held device may include the smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the base station and the network may be implemented even the wireless device and a specific wireless device 2000a may operate a base station/network node for another wireless device.

The wireless devices 1000a to 1000f may be connected to a network 3000 through a base station 2000. An artificial intelligence (AI) technology may be applied to the wireless devices 1000a to 1000f and the wireless devices 1000a to 1000f may be connected to an AI server 4000 through the network 300. The network 3000 may be configured by using a 3G network, a 4G (e.g., LTE) network, or a 5G (e.g., NR) network. The wireless devices 1000a to 1000f may communicate with each other through the base station 2000/network 3000, but may directly communicate with each other without going through the base station/network (sidelink communication). For example, the vehicles 1000b-1 and 1000b-2 may perform direct communication (e.g., Vehicle to Vehicle (V2V)/Vehicle to everything (V2X) communication). Furthermore, the IoT device (e.g., sensor) may perform direct communication with other IoT devices (e.g., sensor) or other wireless devices 1000a to 1000f.

Wireless communications/connections 1500a, 1500b, and 1500c may be made between the wireless devices 1000a to 1000f/the base station 2000 and between the base station 2000 and the base station 2000. Here, the wireless communication/connection may be made through various wireless access technologies (e.g., 5G NR) such as uplink/downlink communication 1500a, sidelink communication 1500b (or D2D communication), and inter-base station communication 1500c (e.g., relay, Integrated Access Backhaul (IAB)). The wireless device and the base station/the wireless device and the base station and the base station may transmit/receive radio signals to/from each other through wireless communications/connections 1500a, 1500b, and 1500c. For example, the wireless communications/connections 1500a, 1500b, and 1500c may transmit/receive signals through various physical channels. To this end, based on various proposals of the present disclosure, at least some of various configuration information setting processes, various signal processing processes (e.g., channel encoding/decoding, modulation/demodulation, resource mapping/demapping, etc.), a resource allocation process, and the like for transmission/reception of the radio signal may be performed.

Example of Wireless Device to Which Present Disclosure is Applied

FIG. 20 illustrates a wireless device applicable to the present disclosure.

Referring to FIG. 20, a first wireless device 1000 and a second wireless device 2000 may transmit/receive radio signals through various wireless access technologies (e.g., LTE and NR). Here, the first wireless device 1000 and the second wireless device 2000 may correspond to a wireless device 1000x and a base station 2000 and/or a wireless device 1000x and a wireless device 1000x of FIG. 19.

The first wireless device 1000 may include one or more processors 1020 and one or more memories 1040 and additionally further include one or more transceivers 1060 and/or one or more antennas 1080. The processor 1020 may control the memory 1040 and/or the transceiver 1060 and may be configured to implement descriptions, functions, procedures, proposals, methods, and/or operation flows disclosed in the present disclosure. For example, the processor 1020 may process information in the memory 1040 and generate a first information/signal and then transmit a radio signal including the first information/signal through the transceiver 1060. Furthermore, the processor 1020 may receive a radio signal including a second information/signal through the transceiver 1060 and then store in the memory 1040 information obtained from signal processing of the second information/signal. The memory 1040 may connected to the processor 1020 and store various information related to an operation of the processor 1020. For example, the memory 1040 may store a software code including instructions for performing some or all of processes controlled by the processor 1020 or performing the descriptions, functions, procedures, proposals, methods, and/or operation flowcharts disclosed in the present disclosure. Here, the processor 1020 and the memory 1040 may be a part of a communication modem/circuit/chip designated to implement the wireless communication technology (e.g., LTE and NR). The transceiver 1060 may be connected to the processor 1020 and may transmit and/or receive the radio signals through one or more antennas 1080. The transceiver 1060 may include a transmitter and/or a receiver. The transceiver 1060 may be used mixedly with a radio frequency (RF) unit. In the present disclosure, the wireless device may mean the communication modem/circuit/chip.

The second wireless device 2000 may include one or more processors 2020 and one or more memories 2040 and additionally further include one or more transceivers 2060 and/or one or more antennas 2080. The processor 2020 may control the memory 2040 and/or the transceiver 2060 and may be configured to implement descriptions, functions, procedures, proposals, methods, and/or operation flows disclosed in the present disclosure. For example, the processor 2020 may process information in the memory 2040 and generate a third information/signal and then transmit a radio signal including the third information/signal through the transceiver 2060. Furthermore, the processor 2020 may receive a radio signal including a fourth information/signal through the transceiver 2060 and then store in the memory 2040 information obtained from signal processing of the fourth information/signal. The memory 2040 may connected to the processor 2020 and store various information related to an operation of the processor 2020. For example, the memory 2040 may store a software code including instructions for performing some or all of processes controlled by the processor 2020 or performing the descriptions, functions, procedures, proposals, methods, and/or operation flowcharts disclosed in the present disclosure. Here, the processor 2020 and the memory 2040 may be a part of a communication modem/circuit/chip designated to implement the wireless communication technology (e.g., LTE and NR). The transceiver 2060 may be connected to the processor 2020 and may transmit and/or receive the radio signals through one or more antennas 2080. The transceiver 2060 may include a transmitter and/or a receiver and the transceiver 2060 may be used mixedly with the RF unit. In the present disclosure, the wireless device may mean the communication modem/circuit/chip.

Hereinafter, hardware elements of the wireless devices 1000 and 2000 will be described in more detail. Although not limited thereto, one or more protocol layers may be implemented by one or more processors 1020 and 2020. For example, one or more processors 1020 and 2020 may implement one or more layers (e.g., functional layers such as PHY, MAC, RLC, PDCP, RRC, and SDAP). One or more processors 1020 and 2020 may generate one or more protocol data units (PDUs) and/or one or more service data units (SDUs) according to the descriptions, functions, procedures, proposals, methods, and/or operation flowcharts disclosed in the present disclosure. One or more processors 1020 and 2020 may generate a message, control information, data, or information according to the descriptions, functions, procedures, proposals, methods, and/or operation flowcharts disclosed in the present disclosure. One or more processors 1020 and 2020 may generate a signal (e.g., a baseband signal) including the PDU, the SDU, the message, the control information, the data, or the information according to the function, the procedure, the proposal, and/or the method disclosed in the present disclosure and provide the generated signal to one or more transceivers 1060 and 2060. One or more processors 1020 and 2020 may receive the signal (e.g., baseband signal) from one or more transceivers 1060 and 2060 and acquire the PDU, the SDU, the message, the control information, the data, or the information according to the descriptions, functions, procedures, proposals, methods, and/or operation flowcharts disclosed in the present disclosure.

One or more processors 1020 and 2020 may be referred to as a controller, a microcontroller, a microprocessor, or a microcomputer. One or more processors 1020 and 2020 may be implemented by hardware, firmware, software, or a combination thereof. As one example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 1020 and 2020. The descriptions, functions, procedures, proposals, and/or operation flowcharts disclosed in the present disclosure may be implemented by using firmware or software and the firmware or software may be implemented to include modules, procedures, functions, and the like. Firmware or software configured to perform the descriptions, functions, procedures, proposals, and/or operation flowcharts disclosed in the present disclosure may be included in one or more processors 1020 and 2020 or stored in one or more memories 1040 and 2040 and driven by one or more processors 1020 and 2020. The descriptions, functions, procedures, proposals, and/or operation flowcharts disclosed in the present disclosure may be implemented by using firmware or software in the form of a code, the instruction and/or a set form of the instruction.

One or more memories 1040 and 2040 may be connected to one or more processors 1020 and 2020 and may store various types of data, signals, messages, information, programs, codes, instructions, and/or commands. One or more memories 1040 and 2040 may be configured by a ROM, a RAM, an EPROM, a flash memory, a hard drive, a register, a cache memory, a computer reading storage medium, and/or a combination thereof. One or more memories 1040 and 2040 may be positioned inside and/or outside one or more processors 1020 and 2020. Furthermore, one or more memories 1040 and 2040 may be connected to one or more processors 1020 and 2020 through various technologies such as wired or wireless connection.

One or more transceivers 1060 and 2060 may transmit to one or more other devices user data, control information, a wireless signal/channel, etc., mentioned in the methods and/or operation flowcharts of the present disclosure. One or more transceivers 1060 and 2060 may receive from one or more other devices user data, control information, a wireless signal/channel, etc., mentioned in the descriptions, functions, procedures, proposals, methods, and/or operation flowcharts disclosed in the present disclosure. For example, one or more transceivers 1060 and 2060 may be connected to one or more processors 1020 and 2020 and transmit and receive the radio signals. For example, one or more processors 1020 and 2020 may control one or more transceivers 1060 and 2060 to transmit the user data, the control information, or the radio signal to one or more other devices. Furthermore, one or more processors 1020 and 2020 may control one or more transceivers 1060 and 2060 to receive the user data, the control information, or the radio signal from one or more other devices. Furthermore, one or more transceivers 1060 and 2060 may be connected to one or more antennas 1080 and 2080 and one or more transceivers 1060 and 2060 may be configured to transmit and receive the user data, control information, wireless signal/channel, etc., mentioned in the descriptions, functions, procedures, proposals, methods, and/or operation flowcharts disclosed in the present disclosure through one or more antennas 1080 and 2080. In the present disclosure one or more antennas may be a plurality of physical antennas or a plurality of logical antennas (e.g., antenna ports). One or more transceivers 1060 and 2060 may convert the received radio signal/channel from an RF band signal to a baseband signal in order to process the received user data, control information, radio signal/channel, etc., by using one or more processors 1020 and 2020. One or more transceivers 1060 and 2060 may convert the user data, control information, radio signal/channel, etc., processed by using one or more processors 1020 and 2020, from the baseband signal into the RF band signal. To this end, one or more transceivers 1060 and 2060 may include an (analog) oscillator and/or filter.

Utilization Example of Wireless Device to Which Present Disclosure is Applied

FIG. 21 illustrates another example of a wireless device applied to the present disclosure.

The wireless device may be implemented as various types according to a use example/service (see FIG. 19). Referring to FIG. 21, wireless devices 1000 and 2000 may correspond to the wireless devices 1000 and 2000 of FIG. 18 and may be constituted by various elements, components, units, and/or modules. For example, the wireless devices 1000 and 2000 may include a communication unit 1100, a control unit 1200, and a memory unit 1300, and an additional element 1400. The communication unit may include a communication circuit 1120 and a transceiver(s) 1140. For example, the communication circuit 1120 may include one or more processors 1020 and 2020 and/or one or more memories 1040 and 2040 of FIG. 20. For example, the transceiver(s) 1140 may include one or more transceivers 1060 and 2060 and/or one or more antennas 1080 and 2080 of FIG. 20. The control unit 1200 is electrically connected to the communication unit 1100, the memory unit 1300, and the additional element 1400 and controls an overall operation of the wireless device. For example, the control unit 1200 may an electrical/mechanical operation of the wireless device based on a program/code/instruction/information stored in the memory unit 1300. Furthermore, the control unit 1200 may transmit the information stored in the memory unit 1300 to the outside (e.g., other communication devices) through the communication unit 1100 via a wireless/wired interface or store, in the memory unit 1300, information received from the outside (e.g., other communication devices) through the wireless/wired interface through the communication unit 1100.

The additional element 1400 may be variously configured according to the type of wireless device. For example, the additional element 1400 may include at least one of a power unit/battery, an input/output (I/O) unit, a driving unit, and a computing unit. Although not limited thereto, the wireless device may be implemented as a form such as the robot 1000a of FIG. 19, the vehicles 1000b-1 and 1000b-2 of FIG. 19, the XR device 1000c of FIG. 19, the hand-held device 100d of FIG. 19, the home appliance 1000e of FIG. 19, the IoT device 1000f of FIG. 19, a digital broadcasting terminal, a hologram device, a public safety device, an MTC device, a medical device, a fintech device (or financial device), a security device, a climate/environment device, an AI server/device 4000 of FIG. 19, the base station 2000 of FIG. 19, a network node, etc. The wireless device may be movable or may be used at a fixed place according to a use example/service.

In FIG. 21, all of various elements, components, units, and/or modules in the wireless devices 1000 and 2000 may be interconnected through the wired interface or at least may be wirelessly connected through the communication unit 1100. For example, the control unit 1200 and the communication 1100 in the wireless devices 1000 and 2000 may be wiredly connected and the control unit 1200 and the first unit (e.g., 1300 or 1400) may be wirelessly connected through the communication unit 1100. Further, each element, component, unit, and/or module in the wireless devices 1000 and 2000 may further include one or more elements. For example, the control unit 1200 may be constituted by one or more processor sets. For example, the control unit 1200 may be configured a set of a communication control processor, an application processor, an electronic control unit (ECU), a graphic processing processor, a memory control processor, etc. As another example, the memory 1300 may be configured as a random access memory (RAM), a dynamic RAM (DRAM), a read only memory (ROM), a flash memory, a volatile memory, a non-volatile memory, and/or combinations thereof.

FIG. 22 illustrates a hand-held device applied to the present disclosure.

The hand-held device may include a smart phone, a smart pad, a wearable device (e.g., a smart watch, a smart glass), and a hand-held computer (e.g., a notebook, etc.). The hand-held device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 22, a hand-held device 1000 may include an antenna unit 1080, a communication unit 1100, a control unit 1200, a memory unit 1300, a power supply unit 1400a, an interface unit 1400b, and an input/output unit 1400c. The antenna unit 1080 may be configured as a part of the communication unit 1100. The blocks 1100 to 1300/1400a to 1400c correspond to the blocks 1100 to 1300/1400 of FIG. 20, respectively.

The communication unit 1100 may transmit/receive a signal (e.g., data, a control signal, etc.) to/from other wireless devices and base stations. The control unit 1200 may perform various operations by controlling components of the hand-held device 1000. The control unit 1200 may include an Application Processor (AP). The memory unit 1300 may store data/parameters/programs/codes/instructions required for driving the hand-held device 1000. Furthermore, the memory unit 1300 may store input/output data/information, etc. The power supply unit 1400a may supply power to the hand-held device 1000 and include a wired/wireless charging circuit, a battery, and the like. The interface unit 1400b may support a connection between the hand-held device 1000 and another external device. The interface unit 1400b may include various ports (e.g., an audio input/output port, a video input/output port) for the connection with the external device. The input/output unit 1400c may receive or output a video information/signal, an audio information/signal, data, and/or information input from a user. The input/output unit 1400c may include a camera, a microphone, a user input unit, a display unit 1400d, a speaker, and/or a haptic module.

As one example, in the case of data communication, the input/output unit 1400c may acquire information/signal (e.g., touch, text, voice, image, and video) input from the user and the acquired information/signal may be stored in the memory unit 1300. The communication unit 1100 may transform the information/signal stored in the memory into the radio signal and directly transmit the radio signal to another wireless device or transmit the radio signal to the base station. Further, the communication unit 1100 may receive the radio signal from another wireless device or base station and then reconstruct the received radio signal into original information/signal. The reconstructed information/signal may be stored in the memory unit 1300 and then output in various forms (e.g., text, voice, image, video, haptic) through the input/output unit 1400c.

In the embodiments described above, the components and the features of the present disclosure are combined in a predetermined form. Each component or feature should be considered as an option unless otherwise expressly stated. Each component or feature may be implemented not to be associated with other components or features. Furthermore, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

Although a method of transmitting and receiving data in a wireless communication system supporting an unlicensed band according to the present disclosure has been described based on an example in which the method is applied to a 3GPP LTE/LTE-A system or a 5G system (New RAT system), the method may be applied to various wireless communication systems in addition to the 3GPP LTE/LTE-A system or 5G system.

The invention claimed is:

1. A method of receiving, by a user equipment (UE), a paging message in a wireless communication system using an unlicensed band, the method comprising:
receiving, from a base station, a synchronization signal and physical broadcast channel block (SS/PBCH block);
receiving, from the base station, system information related to paging occasion (PO) configuration information including paging frame (PF) set information;
receiving, from the base station, control information related to paging based on the PO configuration information; and
receiving, from the base station, a paging message based on the control information,
wherein the PF set information is information for bundling of PFs,
wherein POs related to the PFs are consecutively configured in a time domain,
wherein, in the time domain, a symbol of a first PO among the POs is determined based on a configured number of symbols after a symbol of the SS/PBCH, and
wherein a Listen Before Talk (LBT) operation for the POs is performed before the first PO.

2. The method of claim 1, wherein the POs are consecutively configured in a first PF among the PFs.

3. The method of claim 1, wherein the PF set information is defined as a factor of a Discontinuous Reception (DRX) cycle.

4. The method of claim 3, wherein the PO configuration information further includes information for a repetition cycle, and
wherein the POs are configured repeatedly at the repetition cycle within the DRX cycle.

5. The method of claim 4, wherein the repeated POs are shuffled and configured.

6. A user equipment (UE) receiving a paging message in a wireless communication system using an unlicensed band, the UE comprising:
a Radio Frequency (RF) unit transmitting/receiving a radio signal; and
a processor functionally connected to the RF unit,
wherein the processor is configured to:
receiving, from a base station, a synchronization signal and physical broadcast channel block (SS/PBCH block);
receive, from the base station, system information related to paging occasion (PO) configuration information including paging frame (PF) set information,
receive, from the base station, control information related to paging based on the PO configuration information, and
receive, from the base station, a paging message based on the control information,
wherein the PF set information is information for bundling of PFs,
wherein POs related to the PFs are consecutively configured in a time domain,
wherein, in the time domain, a symbol of a first PO among the POs is determined based on a configured number of symbols after a symbol of the SS/PBCH, and
wherein a Listen Before Talk (LBT) operation for the POs is performed before the first PO.

7. The UE of claim 6, wherein the POs are consecutively configured in a first PF among the PFs.

8. The UE of claim 6, wherein the PF set information is defined as a factor of a Discontinuous Reception (DRX) cycle.

9. The UE of claim 8, wherein the PO configuration information further includes information for a repetition cycle, and
wherein the POs are configured repeatedly at the repetition cycle within the DRX cycle.

10. The UE of claim 9, wherein the repeated POs are shuffled and configured.

11. A base station transmitting a paging message in a wireless communication system using an unlicensed band, the base station comprising:
a Radio Frequency (RF) unit transmitting/receiving a radio signal; and
a processor functionally connected to the RF unit,
wherein the processor is configured to:
transmit, to a user equipment (UE), a synchronization signal and physical broadcast channel block (SS/PBCH block);
transmit, to the UE, system information related to paging occasion (PO) configuration information including paging frame (PF) set information,
transmit, to the UE, control information related to paging based on the PO configuration information, and
transmit, to the UE, a paging message based on the control information,
wherein the PF set information is information for bundling of PFs,
wherein POs related to the PFs are consecutively configured in a time domain,
wherein, in the time domain, a symbol of a first PO among the POs is determined based on a configured number of symbols after a symbol of the SS/PBCH, and
wherein a Listen Before Talk (LBT) operation for the POs is performed before the first PO.

12. The base station of claim 11, wherein the POs are consecutively configured in a first PF among the PFs.

13. The method of claim 1, wherein the POs are contiguously starting from a physical downlink control channel (PDCCH) monitoring window closest to the SS/PBCH block.

14. The UE of claim 6, wherein the POs are contiguously starting from a physical downlink control channel (PDCCH) monitoring window closest to the SS/PBCH block.

15. The base station of claim 11, wherein the POs are contiguously starting from a physical downlink control channel (PDCCH) monitoring window closest to the SS/PBCH block.

* * * * *